(12) United States Patent
Dandurand

(10) Patent No.: US 11,639,209 B2
(45) Date of Patent: May 2, 2023

(54) TRACK FOR TRACTION OF A VEHICLE

(71) Applicant: CAMSO INC., Magog (CA)

(72) Inventor: Jules Dandurand, Sherbrooke (CA)

(73) Assignee: Camso Inc., Magog (CA)

( * ) Notice: Subject to any disclaimer, the term of this patent is extended or adjusted under 35 U.S.C. 154(b) by 48 days.

(21) Appl. No.: 15/712,818

(22) Filed: Sep. 22, 2017

(65) Prior Publication Data
US 2019/0092405 A1 Mar. 28, 2019

(51) Int. Cl.
| B62D 55/24 | (2006.01) |
|---|---|
| B62D 55/125 | (2006.01) |
| B62D 55/07 | (2006.01) |
| B62M 27/02 | (2006.01) |

(52) U.S. Cl.
CPC .......... B62D 55/244 (2013.01); B62D 55/07 (2013.01); B62D 55/125 (2013.01); B62M 27/02 (2013.01); *B62M 2027/021* (2013.01); *B62M 2027/022* (2013.01); *B62M 2027/027* (2013.01)

(58) Field of Classification Search
CPC ...... B62D 55/24; B62D 55/244; B62D 55/26; B62D 55/18; B62M 2027/022; B62M 2027/027
See application file for complete search history.

(56) References Cited

U.S. PATENT DOCUMENTS

| 5,709,440 A * | 1/1998 | Lecours | B62D 55/096 305/165 |
|---|---|---|---|
| 5,713,645 A * | 2/1998 | Thompson | B62D 55/24 305/168 |
| 5,730,510 A * | 3/1998 | Courtemanche | B62D 55/096 305/168 |
| 6,505,896 B1 * | 1/2003 | Boivin | B62D 55/24 305/160 |
| 6,609,771 B2 * | 8/2003 | Morin | B62M 27/00 305/167 |
| 6,935,708 B2 * | 8/2005 | Courtemanche | B62D 55/244 305/165 |
| 6,973,988 B2 * | 12/2005 | Morin | B62M 27/00 180/182 |
| 7,018,005 B2 * | 3/2006 | Lemieux | B62D 55/244 305/165 |

(Continued)

FOREIGN PATENT DOCUMENTS

| CA | 178059 | 4/2019 |
|---|---|---|
| CA | 183794 | 4/2019 |
| CA | 183795 | 4/2019 |

OTHER PUBLICATIONS

Examiner's report dated Jun. 22, 2018, in connection with industrial design application No. 178,059, 2 pages.

(Continued)

*Primary Examiner* — Jason R Bellinger
(74) *Attorney, Agent, or Firm* — Hahn Loeser & Parks LLP; Bret A. Hrivnak

(57) ABSTRACT

A track for traction of a vehicle e.g., a snowmobile, a snow bike, an all-terrain vehicle (ATV), etc.), in which the track may have features to enhance its traction, floatation, and/or other aspects of its performance, including to be lightweight, facilitate turning, enhance acceleration, reduce noise, adapt to different ground conditions, and/or provide other benefits.

35 Claims, 13 Drawing Sheets

(56) References Cited

U.S. PATENT DOCUMENTS

| | | | |
|---|---|---|---|
| 7,048,344 B2* | 5/2006 | Courtemanche | B62D 55/244 305/165 |
| 7,159,955 B2* | 1/2007 | St-Pierre | B62D 55/244 305/168 |
| 7,618,102 B2* | 11/2009 | Dandurand | B62D 55/26 305/165 |
| D653,681 S | 2/2012 | Detgyarev | |
| 10,392,060 B2* | 8/2019 | Dandurand | B62D 55/27 |
| D870,594 S | 12/2019 | Dandurand et al. | |
| D881,751 S | 4/2020 | Detgyarev | |
| 2003/0122424 A1* | 7/2003 | St-Pierre | B62D 55/24 305/168 |
| 2004/0164613 A1* | 8/2004 | Konickson | B62D 55/096 305/165 |
| 2004/0217648 A1 | 11/2004 | Rasmussen et al. | |
| 2006/0006737 A1* | 1/2006 | Dandurand | B62D 55/244 305/178 |
| 2008/0007119 A1 | 1/2008 | Schindler et al. | |
| 2013/0134773 A1 | 5/2013 | Dandurand et al. | |
| 2015/0091373 A1* | 4/2015 | Pard | B62D 55/253 305/179 |
| 2016/0016639 A1* | 1/2016 | Pard | B62D 55/24 180/193 |
| 2017/0043821 A1* | 2/2017 | Dandurand | B62D 55/07 |
| 2017/0197677 A1 | 7/2017 | Dandurand et al. | |

OTHER PUBLICATIONS

Examiner's report dated Oct. 31, 2018, in connection with industrial design application No. 178,059, 2 pages.
Examiner's report dated Oct. 31, 2018, in connection with industrial design application No. 183,794, 2 pages.
Examiner's report dated Oct. 31, 2018, in connection with industrial design application No. 183,795, 2 pages.

* cited by examiner

TRACK FOR TRACTION OF A VEHICLE

FIELD

This disclosure relates generally to tracks for traction of vehicles such as snowmobiles, all-terrain vehicles (ATVs), and other off-road vehicles.

BACKGROUND

Certain vehicles may be equipped with tracks which enhance their traction and floatation on soft, slippery and/or irregular grounds (e.g., snow, ice, soil, mud, sand, etc.) on which they operate.

For example, snowmobiles allow efficient travel on snowy and in some cases icy grounds. A snowmobile comprises a track system which engages the ground to provide traction. The track system comprises a track-engaging assembly and a track that moves around the track-engaging assembly and engages the ground to generate traction. The track typically comprises an elastomeric body in which are embedded certain reinforcements, such as transversal stiffening rods providing transversal rigidity to the track, longitudinal cables providing tensional strength, and/or fabric layers. The track-engaging assembly comprises wheels and in some cases slide rails around which the track is driven.

A snowmobile's track may face a number of challenges during riding. For example, while turning, a user may desire to shift his/her weight laterally to turn more aggressively, but this may cause issues as the track may be designed for traction when perfectly horizontal on the ground. As another example, the track may be exposed to different snow conditions (e.g., loose snow vs. packed snow) that can affect its traction and/or floatation.

Similar considerations may arise for tracks of other types of off-road vehicles (e.g., snow bikes, all-terrain vehicles (ATVs), agricultural vehicles, or other vehicles that travel on uneven grounds) in certain situations.

For these and other reasons, there is a need to improve tracks for traction of vehicles.

SUMMARY

In accordance with various aspects of this disclosure, there is provided a track for traction of a vehicle, in which the track may have features to enhance its traction, floatation, and/or other aspects of its performance, including to be lightweight, facilitate turning, enhance acceleration, reduce noise, adapt to different ground conditions, and/or provide other benefits.

For example, in accordance with an aspect of this disclosure, there is provided a track for traction of a vehicle. The track is movable around a track-engaging assembly comprising a plurality of track-contacting wheels. The track comprises a ground-engaging outer surface for engaging the ground, an inner surface opposite to the ground-engaging outer surface, and a plurality of traction projections projecting from the ground-engaging outer surface. A central one of the tractions projections is located between lateral ones of the traction projections in a widthwise direction of the track. The central one of the tractions projections is taller than the lateral ones of the traction projections. A top surface of the central one of the traction projections is substantially flat for at least a majority of a length of the central one of the traction projections.

In accordance with another aspect of this disclosure, there is provided a track for traction of a vehicle. The track is movable around a track-engaging assembly comprising a plurality of track-contacting wheels. The track comprises a ground-engaging outer surface for engaging the ground, an inner surface opposite to the ground-engaging outer surface, and a plurality of traction projections projecting from the ground-engaging outer surface. A central one of the tractions projections is located between lateral ones of the traction projections in a widthwise direction of the track and is taller than the lateral ones of the traction projections. The central one of the traction projections comprises a propulsive protrusion extending transversally to a longitudinal direction of the track and a reinforcing protrusion larger than the propulsive protrusion of the central one of the traction projections in the longitudinal direction of the track.

In accordance with another aspect of this disclosure, there is provided a track for traction of a vehicle. The track is movable around a track-engaging assembly comprising a plurality of track-contacting wheels. The track comprises a ground-engaging outer surface for engaging the ground, an inner surface opposite to the ground-engaging outer surface, and a plurality of traction projections projecting from the ground-engaging outer surface. A central one of the tractions projections is located between lateral ones of the traction projections in a widthwise direction of the track. The central one of the tractions projections is taller than the lateral ones of the traction projections. The central one of the traction projections occupies more than one-third of a width of the track.

In accordance with another aspect of this disclosure, there is provided a track for traction of a vehicle. The track is movable around a track-engaging assembly comprising a plurality of track-contacting wheels. The track comprises a ground-engaging outer surface for engaging the ground, an inner surface opposite to the ground-engaging outer surface, a plurality of traction projections projecting from the ground-engaging outer surface, and a plurality of windows extending from the ground-engaging outer surface to the inner surface. A central one of the tractions projections is located between lateral ones of the traction projections in a widthwise direction of the track. The central one of the tractions projections is taller than the lateral ones of the traction projections. The central one of the traction projections occupies at least 80% of a distance between a first one of the windows and a second one of the windows in the widthwise direction of the track In accordance with another aspect of this disclosure, there is provided a track for traction of a vehicle. The track is movable around a track-engaging assembly comprising a plurality of track-contacting wheels. The track comprises a ground-engaging outer surface for engaging the ground, an inner surface opposite to the ground-engaging outer surface, and a plurality of traction projections projecting from the ground-engaging outer surface. Each of the traction projections comprises a propulsive protrusion extending transversally to a longitudinal direction of the track and a reinforcing protrusion larger than the propulsive protrusion in the longitudinal direction of the track. The traction projections are disposed in a plurality of traction rows that include respective ones of the traction projections and that are spaced from one another in the longitudinal direction of the track. The traction projections are arranged in a pattern that spans at least three of the traction rows and repeats along the track. The pattern of the traction projections is configured such that the reinforcing protrusions of respective ones of the traction projections converge towards a centerline of the track that bisects the track in the widthwise direction of the track These and other aspects of this disclosure will now become apparent to those of ordinary skill in the art upon review of the following description of embodiments in conjunction with the accompanying drawings.

BRIEF DESCRIPTION OF THE DRAWINGS

A detailed description of embodiments is provided below, by way of example only, with reference to the accompanying drawings, in which.

A detailed description of embodiments of the invention is provided below, by way of example only, with reference to the accompanying drawings, in which.

It is to be expressly understood that the description and drawings are only for the purpose of illustrating certain embodiments and are an aid for understanding. They are not intended to be limiting.

DETAILED DESCRIPTION OF EMBODIMENTS

Figure 1:
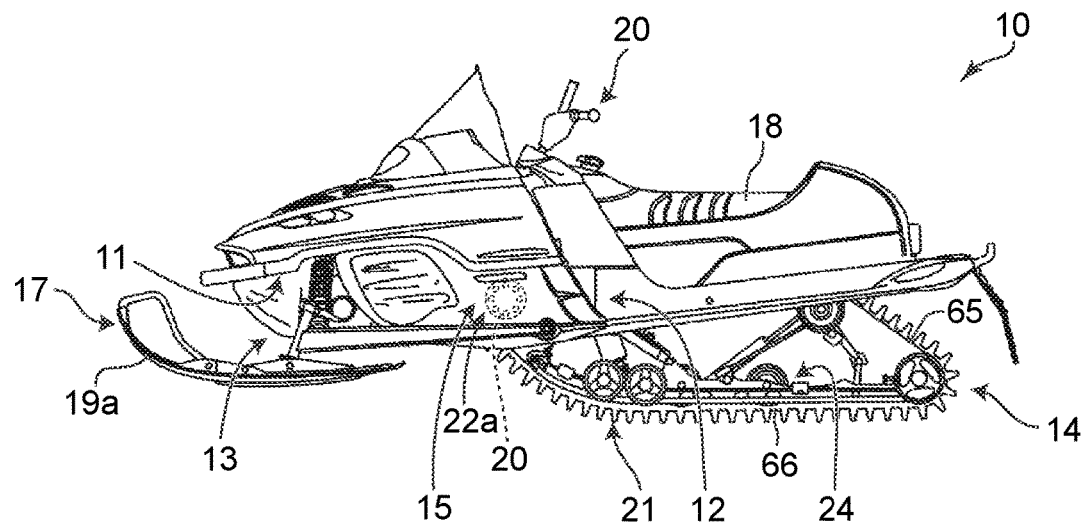
FIG. 1 shows an example of a snowmobile comprising a track system in accordance with an embodiment of the invention.

FIG. 1 shows an example of an embodiment of a vehicle 10 comprising a track system 14. In this embodiment, the vehicle 10 is a snowmobile. The snowmobile 10 is designed for travelling on snow and in some cases ice.

The snowmobile 10 comprises a frame 11, a powertrain 12, the track system 14, a ski system 17, a seat 18, and a user interface 20, which enables a user to ride, steer and otherwise control the snowmobile 10. The track system 14 comprises a track 21 to engage the ground for traction of the snowmobile 10.

In this embodiment, as further discussed below, the track 21 may have features to enhance its traction, floatation, and/or other aspects of its performance, including to be lightweight, facilitate turning (e.g., by reducing friction in certain areas of the track 21 while maintaining penetration and/or other tractive effects in others areas of the track 21 on snow or other ground matter during cornering or otherwise turning), enhance acceleration, reduce noise, adapt to different ground conditions (e.g., different types of snow, soil, etc.), and/or provide other benefits.

The powertrain 12 is configured for generating motive power and transmitting motive power to the track system 14 to propel the snowmobile 10 on the ground. To that end, the powertrain 12 comprises a prime mover 15, which is a source of motive power that comprises one or more motors (e.g., an internal combustion engine, an electric motor, etc.). For example, in this embodiment, the prime mover 15 comprises an internal combustion engine. In other embodiments, the prime mover 15 may comprise another type of motor (e.g., an electric motor) or a combination of different types of motor (e.g., an internal combustion engine and an electric motor). The prime mover 15 is in a driving relationship with the track system 14. That is, the powertrain 12 transmits motive power from the prime mover 15 to the track system 14 in order to drive (i.e., impart motion to) the track system 14. In some embodiments, at least part (e.g., a motor and/or a transmission) of the prime mover 15 may be included in the track system 14 (e.g., may be disposed within an envelope of the track 21).

The ski system 17 is turnable to allow steering of the snowmobile 10. In this embodiment, the ski system 17 comprises a pair of skis 19 connected to the frame 11 via a ski-supporting assembly 13.

The seat 18 accommodates the user of the snowmobile 10. In this case, the seat 18 is a straddle seat and the snowmobile 10 is usable by a single person such that the seat 18 accommodates only that person driving the snowmobile 10. In other cases, the seat 18 may be another type of seat, and/or the snowmobile 10 may be usable by two individuals, namely one person driving the snowmobile 10 and a passenger, such that the seat 18 may accommodate both of these individuals (e.g., behind one another) or the snowmobile 10 may comprise an additional seat for the passenger.

The user interface 20 allows the user to interact with the snowmobile 10 to control the snowmobile 10. More particularly, the user interface 20 comprises an accelerator, a brake control, and a steering device that are operated by the user to control motion of the snowmobile 10 on the ground. In this case, the steering device comprises handlebars, although it may comprise a steering wheel or other type of steering element in other cases. The user interface 20 also comprises an instrument panel (e.g., a dashboard) which provides indicators (e.g., a speedometer indicator, a tachometer indicator, etc.) to convey information to the user.

Figure 2:
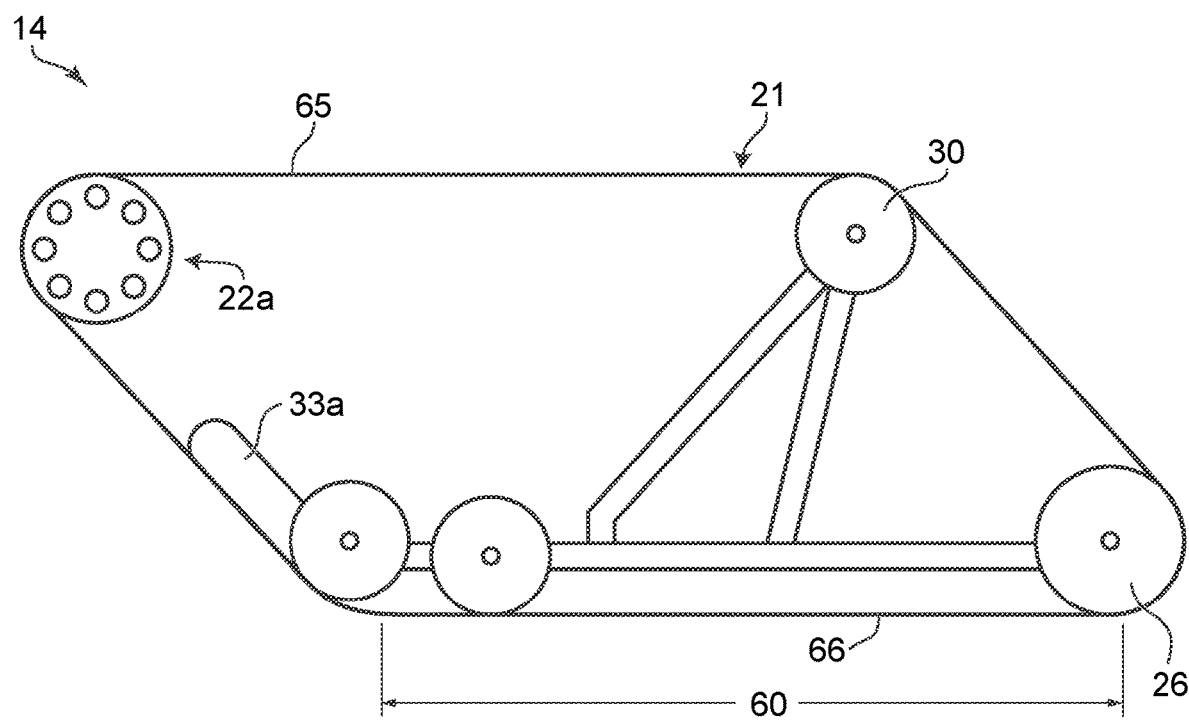
FIG. 2 shows a side view of the track system.
Figure 3:
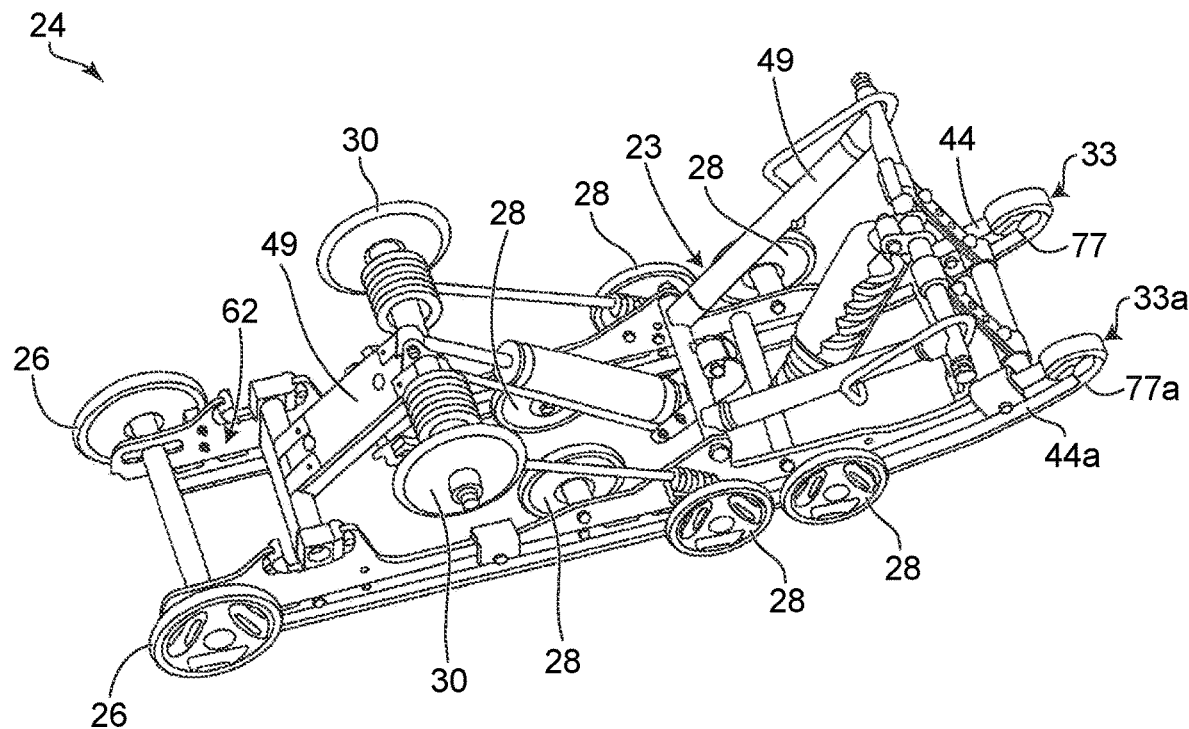
FIG. 3 shows a perspective view of a track-engaging assembly of the track system.
Figure 4:
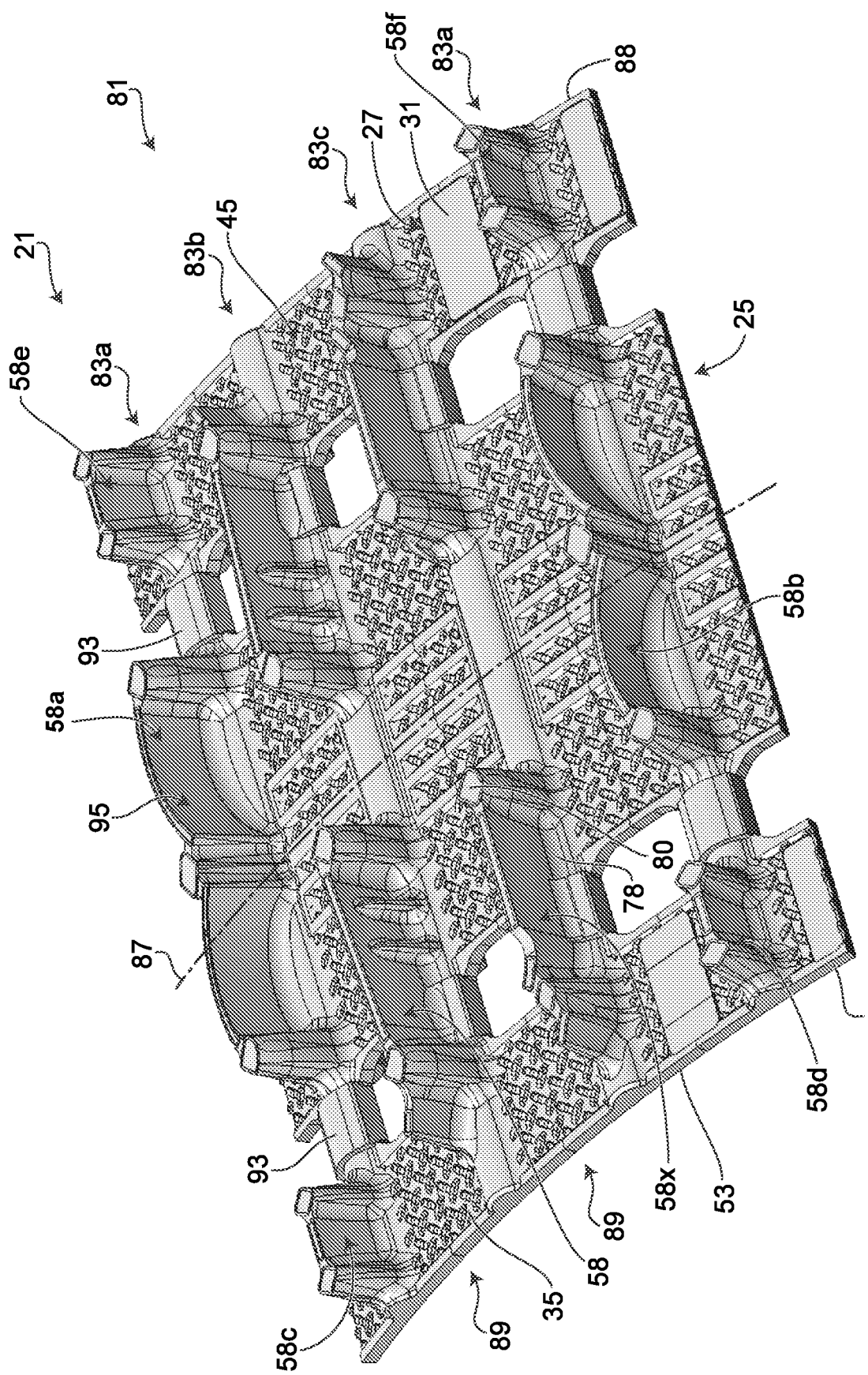
FIGS. 4 to 7 respectively show a perspective view, a plan view, an elevation view, and a longitudinal cross-sectional view of part of a track of the track system.
Figure 5:
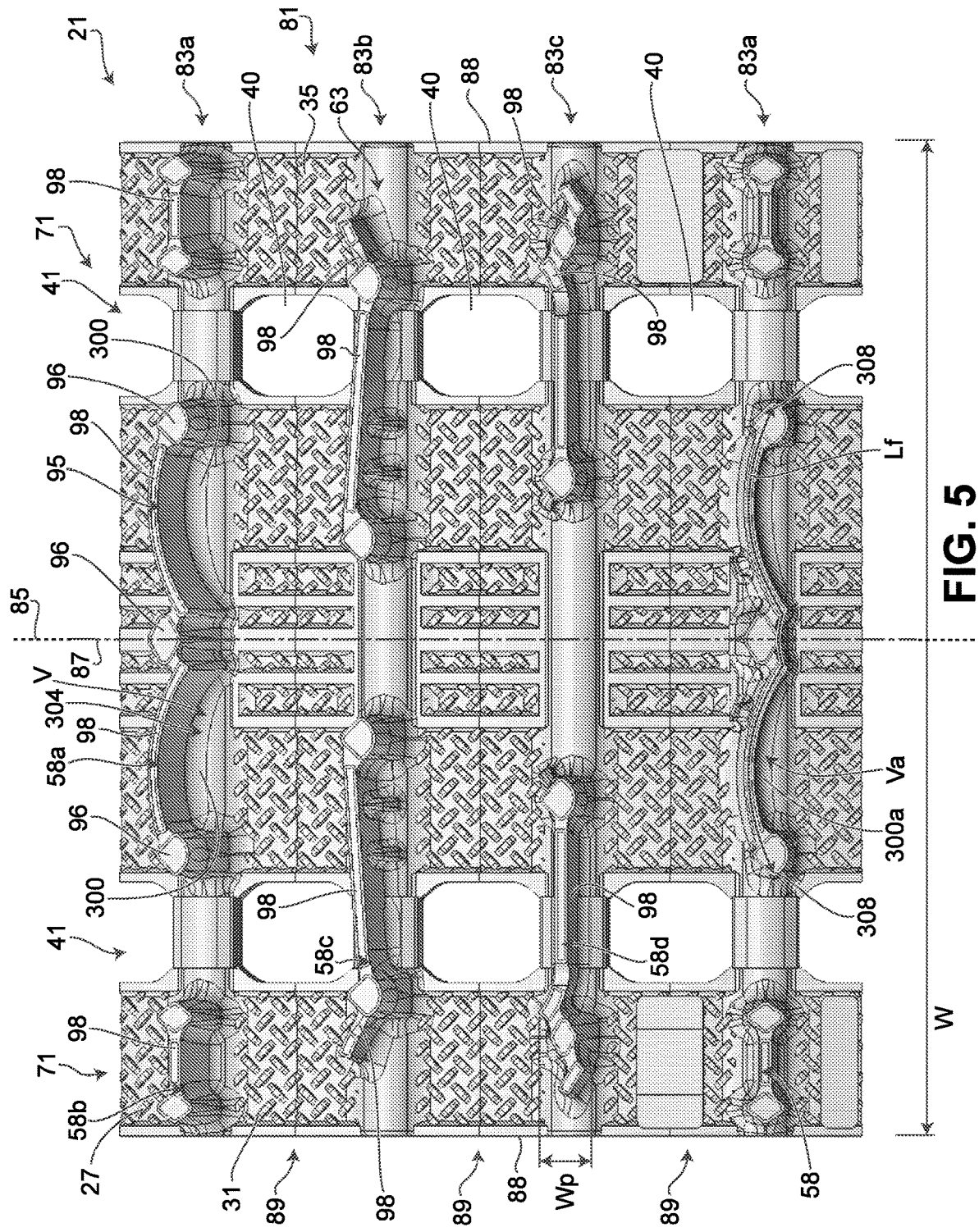
Figure 6:
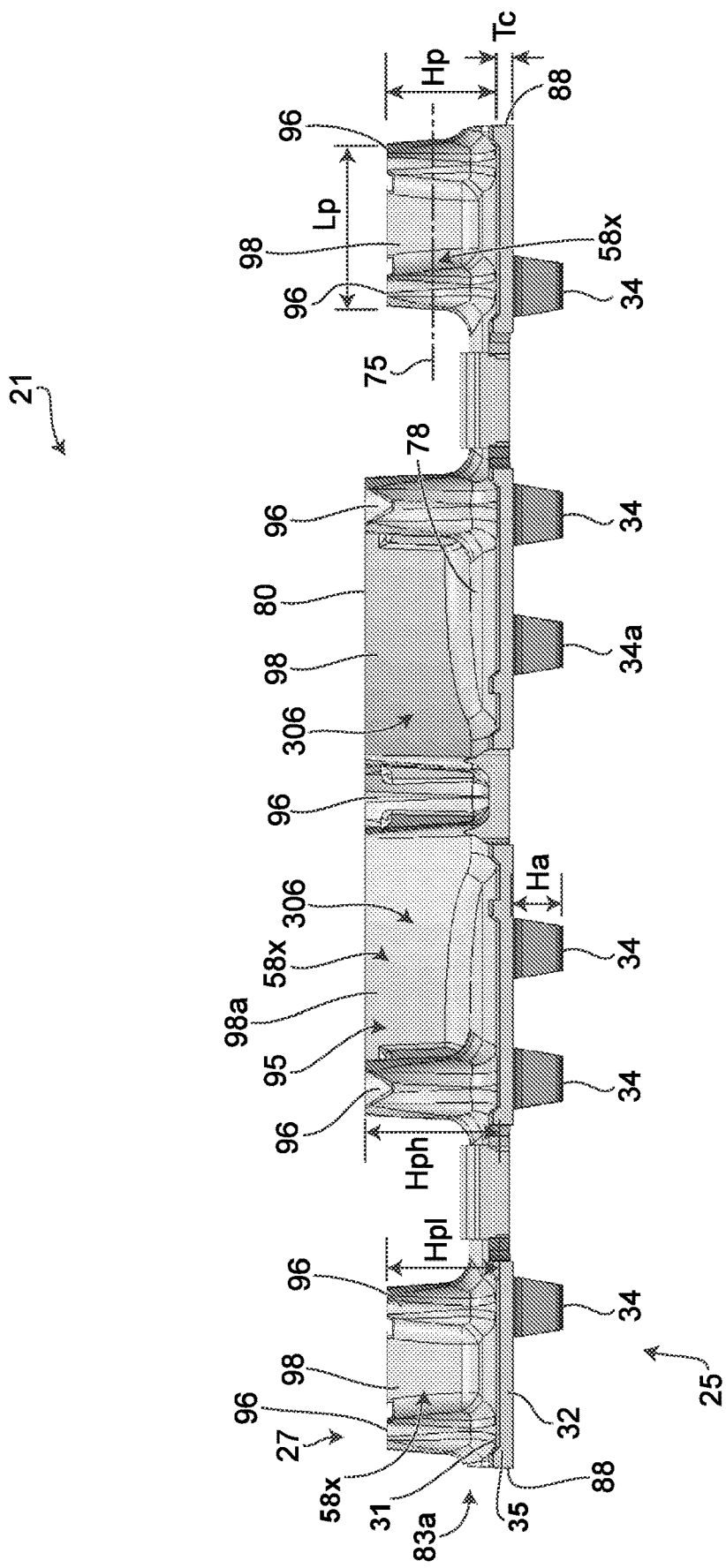
Figure 7:
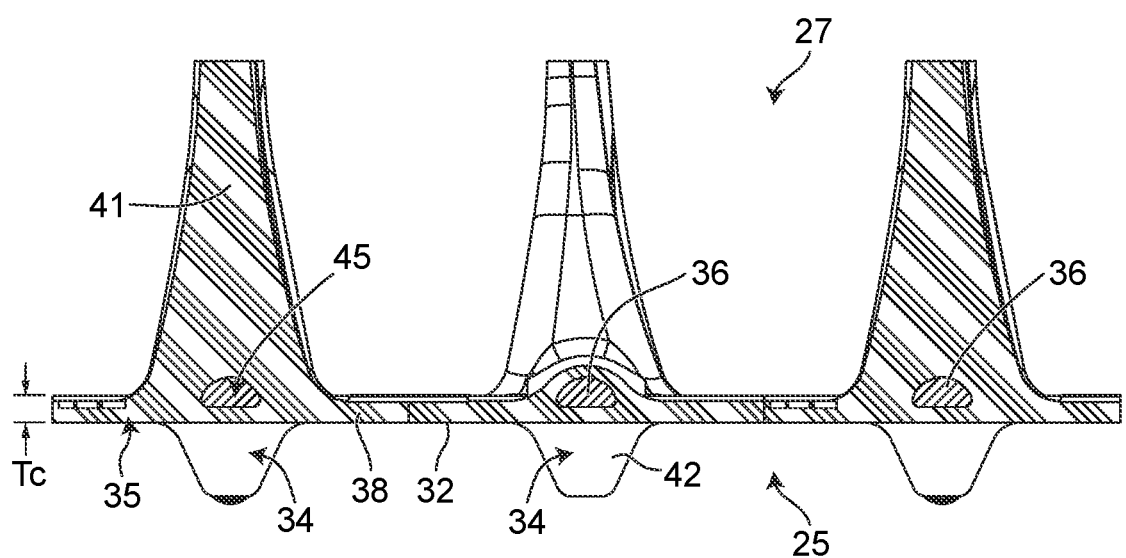

The track system 14 is configured to engage the ground to generate traction for the snowmobile 10. With additional reference to FIGS. 2 and 3, the track system 14 comprises the track 21 and a track-engaging assembly 24 for driving and guiding the track 21 around the track-engaging assembly 24. More particularly, in this embodiment, the track-engaging assembly 24 comprises a frame 23 and a plurality of track-contacting wheels which includes a plurality of drive wheels 22 and a plurality of idler wheels that includes rear idler wheels 26, lower roller wheels 28, and upper roller wheels 30. In this example, the frame 23 comprises an elongate support 62 including sliding surfaces 77 for sliding on the track 21. As it is disposed between the track 21 and the frame 11 of the snowmobile 10, the track-engaging assembly 24 can be viewed as implementing a suspension for the snowmobile 10. The track system 14 has a longitudinal direction and a first longitudinal end and a second longitudinal end that define a length of the track system 14, a widthwise direction and a width that is defined by a width W of the track 21, and a heightwise direction that is normal to its longitudinal direction and its widthwise direction.

The track 21 is configured to engage the ground to provide traction to the snowmobile 10. A length of the track 21 allows the track 21 to be mounted around the track-engaging assembly 24. In view of its closed configuration without ends that allows it to be disposed and moved around the track-engaging assembly 24, the track 21 can be referred to as an "endless" track. With additional reference to FIGS. 4 to 7, the track 21 comprises an inner side 25 for facing the track-engaging assembly 24, a ground-engaging outer side 27 for engaging the ground, and lateral edges 88. A top run 65 of the track 21 extends between the longitudinal ends of the track system 14 and over the track-engaging assembly 24 (including over the wheels 22, 26, 28, 30), and a bottom run 66 of the track 21 extends between the longitudinal ends of the track system 14 and under the track-engaging assembly 24 (including under the wheels 22, 26, 28, 30). The bottom run 66 of the track 21 defines an area of contact 60 of the track 21 with the ground which generates traction and bears a majority of a load on the track system 14, and which will be referred to as a "contact patch" of the track 21 with the ground. The track 21 has a longitudinal axis 85 which defines a longitudinal direction of the track 21 (i.e., a direction generally parallel to its longitudinal axis) and transversal directions of the track (i.e., directions transverse to its longitudinal axis), including a widthwise direction of the track (i.e., a lateral direction generally perpendicular to its longitudinal axis). The track 21 has a thickness direction normal to its longitudinal and widthwise directions.

The track 21 is elastomeric, i.e., comprises elastomeric material 53, to be flexible around the track-engaging assembly 24. The elastomeric material 53 of the track 21 can include any polymeric material with suitable elasticity. In this embodiment, the elastomeric material of the track 21 includes rubber. Various rubber compounds may be used and, in some cases, different rubber compounds may be present in different areas of the track 21. In other embodiments, the elastomeric material 53 of the track 21 may include another elastomer in addition to or instead of rubber (e.g., polyurethane elastomer).

More particularly, the track 21 comprises an endless body 35 underlying its inner side 25 and ground-engaging outer side 27. In view of its underlying nature, the body 35 will be referred to as a "carcass". The carcass 35 is elastomeric in that it comprises elastomeric material 38 which allows the carcass 35 to elastically change in shape and thus the track 21 to flex as it is in motion around the track-engaging assembly 24. The elastomeric material 38, which is part of the elastomeric material 53 of the track 21, can be any polymeric material with suitable elasticity. In this embodiment, the elastomeric material 38 includes rubber. Various rubber compounds may be used and, in some cases, different rubber compounds may be present in different areas of the carcass 35. In other embodiments, the elastomeric material 38 may include another elastomer in addition to or instead of rubber (e.g., polyurethane elastomer).

Figure 8:
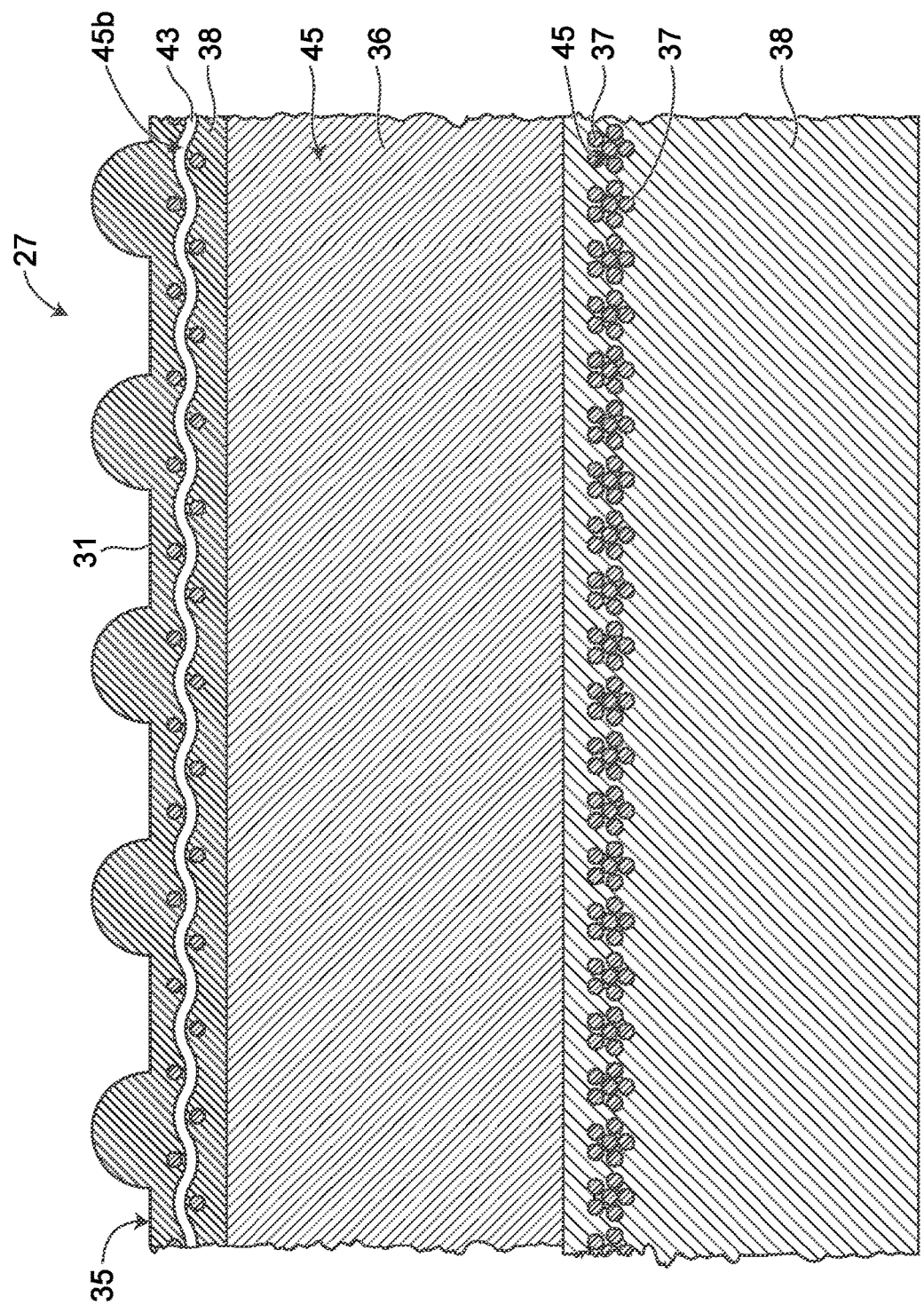
FIG. 8 shows a widthwise cross-sectional view of part of the track.

In this embodiment, as shown in FIG. 8, the carcass 35 comprises a plurality of reinforcements 45 embedded in its rubber 38. These reinforcements 45 can take on various forms.

For example, in this embodiment, a subset of the reinforcements 45 is a plurality of transversal stiffening rods 36 that extend transversally to the longitudinal direction of the track 21 to provide transversal rigidity to the track 21. More particularly, in this embodiment, the transversal stiffening rods 36 extend in the widthwise direction of the track 21. Each of the transversal stiffening rods 36 may have various shapes and be made of any suitably rigid material (e.g., metal, polymer or composite material).

As another example, in this embodiment, given ones of the reinforcements 45, denoted 45a, 45b are reinforcing layers that are flexible in the longitudinal direction of the track 21.

For instance, in this embodiment, the reinforcement 45a is a layer of reinforcing cables 37 that are adjacent to one another and extend generally in the longitudinal direction of the track 21 to enhance strength in tension of the track 21 along its longitudinal direction. In this case, each of the reinforcing cables 37 is a cord including a plurality of strands (e.g., textile fibers or metallic wires). In other cases, each of the reinforcing cables 37 may be another type of cable and may be made of any material suitably flexible longitudinally (e.g., fibers or wires of metal, plastic or composite material). In some examples of implementation, respective ones of the reinforcing cables 37 may be constituted by a single continuous cable length wound helically around the track 21. In other examples of implementation, respective ones of the transversal cables 37 may be separate and independent from one another (i.e., unconnected other than by rubber of the track 21).

Also, in this embodiment, the reinforcement 45b is a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 21 to have a reinforcing effect in a transversal direction of the track 21. For instance, the reinforcing fabric 43 may comprise a ply of reinforcing woven fibers (e.g., nylon fibers or other synthetic fibers). For example, the reinforcing fabric 43 may protect the transversal stiffening rods 36, improve cohesion of the track 21, and counter its elongation.

Also, in this embodiment, the reinforcement $45_j$ is a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 21 to have a reinforcing effect in a transversal direction of the track 21. For instance, the reinforcing fabric 43 may comprise a ply of reinforcing woven fibers (e.g., nylon fibers or other synthetic fibers). For example, the reinforcing fabric 43 may protect the transversal stiffening rods 36, improve cohesion of the track 21, and counter its elongation.

The carcass 35 may be molded into shape in a molding process during which the rubber 38 is cured. For example, in this embodiment, a mold may be used to consolidate layers of rubber providing the rubber 38 of the carcass 35, the reinforcing cables 37 and the layer of reinforcing fabric 43.

The inner side 25 of the track 21 comprises an inner surface 32 of the carcass 35 and a plurality of inner projections 34 that project from the inner surface 32 and are positioned to contact the track-engaging assembly 24 (e.g., at least some of the wheels 22, 26, 28, 30) to do at least one of driving (i.e., imparting motion to) the track 21 and guiding the track 21. Since each of them is used to do at least one of driving the track 21 and guiding the track 21, the inner projections 34 can be referred to as "drive/guide projections" or "drive/guide lugs". In some cases, a given one of the drive/guide lugs, which is denoted 34a, may interact with a given one of the drive wheels 22 to drive the track 21, in which case the drive/guide lug 34a is a drive lug. In other cases, a drive/guide lug 34a may interact with a given one of the idler wheels 26, 28, 30 and/or another part of the track-engaging assembly 24 to guide the track 21 to maintain proper track alignment and prevent de-tracking without being used to drive the track 21, in which case the drive/guide lug 34a is a guide lug. In yet other cases, a drive/guide lug 34a may both (i) interact with a given one of the drive wheels 22 to drive the track 21 and (ii) interact with a given one of the idler wheels 26, 28, 30 and/or another part of the track-engaging assembly 24 to guide the track 21, in which case the drive/guide lug 34a is both a drive lug and a guide lug. A height Ha of a drive/guide lug 34a may have any suitable value.

In this embodiment, each of the drive/guide lugs 34 is an elastomeric drive/guide lug in that it comprises elastomeric material 42. The elastomeric material 42, which is part of the elastomeric material 53 of the track 21, can be any polymeric material with suitable elasticity. More particularly, in this embodiment, the elastomeric material 42 includes rubber. Various rubber compounds may be used and, in some cases, different rubber compounds may be present in different areas of each of the drive/guide lugs 34. In other embodiments, the elastomeric material 42 may include another elastomer in addition to or instead of rubber (e.g., polyurethane elastomer).

The drive/guide lugs 34 may be provided on the inner side 25 in various ways. For example, in this embodiment, the drive/guide lugs 34 are provided on the inner side 25 by being molded with the carcass 35.

In this embodiment, the carcass 35 has a thickness Tc which is relatively small. The thickness Tc of the carcass 35 is measured from the inner surface 32 to the ground-engaging outer surface 31 of the carcass 35 between longitudinally-adjacent ones of the traction projections 58. For example, in some embodiments, the thickness Tc of the carcass 35 may be no more than 0.25 inches, in some cases no more than 0.22 inches, in some cases no more than 0.20 inches, and in some cases even less (e.g., no more than 0.18 or 0.16 inches). The thickness Tc of the carcass 35 may have any other suitable value in other embodiments.

The ground-engaging outer side 27 of the track 21 comprises a ground-engaging outer surface 31 of the carcass 35 and a plurality of traction projections 58 that project from the ground-engaging outer surface 31 to enhance traction on the ground. The traction projections 58, which may be referred to as "traction lugs" or "traction profiles", may have any suitable shape (e.g., straight shapes, curved shapes, shapes with straight parts and curved parts, etc.).

Each of the traction projections 58 includes a base 78 at which it projects from the ground-engaging outer surface 31 and a top surface 80 that is farthest from the ground-engaging outer surface 31. Each of the traction projections 58 has a height Hp in the heightwise direction of the track 21, a dimension Lp in the widthwise direction of the track 21, and a dimension Wp in the longitudinal direction of the track 21. In this embodiment, each of the traction projections 58 has a longitudinal axis 75 such that it is elongated and its dimension Lp in the widthwise direction of the track 21 is a length of that traction projection and its dimension Wp in the longitudinal direction of the track 21 is a width of that traction projection. In this example, the longitudinal axis 75 of each of the traction projections 58 extends transversally to the longitudinal direction of the track 21. More particularly, in this case, the longitudinal axis 75 of each of the traction projections 58 extends in the widthwise direction of the track 21.

In this embodiment, the ground-engaging outer side 27 of the track 21 comprises a plurality of traction rows 83 that include respective ones of the traction projections 58 and that are spaced from one another in the longitudinal direction of the track 21. Each of the traction rows 83 includes one or more of the traction projections 58 and extends transversally to the longitudinal direction of the track 21. In this example, each of the traction rows 83 is oriented to the widthwise direction of the track 21. Also, in this example, adjacent ones of the traction rows 83 are spaced from one another at a spacing (i.e., pitch) in the longitudinal direction of the track 21 and by traction-projection-free areas 89 (i.e., areas free of traction projections) of the ground-engaging outer side 27 of the track 21. Furthermore, in this example, a given one of the traction rows 83 may comprise plural ones of the traction projections 58 and one or more voids 93 between adjacent ones of its traction projections.

Each of the traction projections 58 is an elastomeric traction projection in that it comprises elastomeric material 41. The elastomeric material 41, which is part of the elastomeric material 53 of the track 21, can be any polymeric material with suitable elasticity. More particularly, in this embodiment, the elastomeric material 41 includes rubber. Various rubber compounds may be used and, in some cases, different rubber compounds may be present in different areas of each of the traction projections 58. In other embodiments, the elastomeric material 41 may include another elastomer in addition to or instead of rubber (e.g., polyurethane elastomer).

The traction projections 58 may be provided on the ground-engaging outer side 27 in various ways. For example, in this embodiment, the traction projections 58 are provided on the ground-engaging outer side 27 by being molded with the carcass 35.

In this example, the track 21 comprises windows (i.e., openings) 40 extending therethrough. The track 21 may comprise slide members 39, which can sometimes be referred to as "clips", to slide against the sliding surfaces 77 of the track-engaging assembly 24 to reduce friction and may be mounted via the windows 40. In this case, the track 21 comprises window rows 41 that include respective ones of the windows 40 and are spaced apart from one another in the widthwise direction of the track 21.

In this embodiment, the track 21, including its traction projections 58, may be configured to enhance its traction, floatation, and/or other aspects of its performance, including, for example, to be lightweight, facilitate turning (e.g., by reducing friction in certain areas of the track 21 while maintaining penetration and/or other tractive effects in other areas of the track 21 on snow or other ground matter during cornering or otherwise turning), enhance acceleration, reduce noise, adapt to different ground conditions (e.g., different types of snow, soil, etc.), and/or provide other benefits. For instance, this may be useful when the user transfers his/her weight to perform aggressive turns, when travelling on a trail that can have loose snow or other ground matter and/or packed snow or other ground, and/or in other situations.

For example, in this embodiment, higher central ones of the tractions projections 58 located in a central portion 70 of the track 21, such as the traction projections 58a, 58b, are taller than lower lateral ones of the traction projections 58 located in lateral portions 71 of the track 21, denoted 58c, 58d, 58e, 58f, between which the central portion 70 of the track 21 is located. This may facilitate turning of the snowmobile 10. For example, with additional reference to FIG. 6, the lower lateral ones of the traction projections 58 of a given one of the lateral portions 71 of the track 21 may provide traction while reducing penetration and friction at the given one of the lateral portions 71 of the track 21 when the user transfer his/her weight towards the given one of the lateral portions 71 of the track 21 for an aggressive turn (e.g., making it easier to tilt and allowing a rear or "tail" of the track 21 to slide more easily laterally), whereas the higher central ones of the tractions projections 58 of the central portion 70 of the track 21 maintain penetration and/or other tractive effects in the central portion 70 of the track 21 on snow or other ground matter during turning.

The height Hp of a lower lateral one of the traction projections 58, denoted Hpl, is thus lower than the height Hp of a higher central one of the traction projections 58, denoted Hph. For example, in some embodiments, a ratio of the height Hpl of the lower lateral one of the traction projections 58 over the height Hph of the higher central one of the traction projections 58 may be no more than 95%, in some cases no more than 90%, in some cases no more than 85%, in some cases no more than 80%, and in some cases even less. For instance, in this embodiment, the height Hpl of the lower lateral one of the traction projections 58 is 1.25 inches while the height Hph of the higher central one of the traction projections 58 is 1.5 inches.

In this embodiment, the central portion 70 of the track 21 that includes the higher central ones of the tractions projections 58 is disposed between the window rows 41, and thus the slide members 39 if applicable, while each of the lateral portions 71 of the track 21 that includes one or more of the lower central ones of the tractions projections 58 is disposed between a respective one of the window rows 41 and a respective one of the lateral edges 88 of the track 21 that is closest to that window row. This may help traction when turning as the lower central ones of the tractions projections 58 are contained between a respective one of the lateral edges 88 of the track 21 and a respective one of the sliding surfaces 77 of the track-engaging assembly 24. In this example, the higher central ones of the tractions projections 58 are spaced apart from the lower central ones of the tractions projections 58 in the widthwise direction of the track 21 by one or more of the voids 93 free of traction projections.

Also, in this embodiment, each of the higher central ones of the traction projections 58 occupies a significant part of the width of the track 21. For example, in some embodiments, each of the higher central ones of the traction projections 58 occupies more than one-third, in some cases at least 40%, in some cases at least 45%, and in some cases even more of the width of the track 21. For instance, each of the higher central ones of the traction projections 58 may occupy at least 80%, in some cases at least 90%, and in some cases substantially an entirety of a distance between the window rows 41 in the widthwise direction of the track 21.

Furthermore, in this embodiment, the top surface 80 of each of the higher central ones of the traction projections 58 is substantially flat (i.e., level) for at least a majority (i.e., a majority or an entirety) of the length Lp of that traction projection. This may help to maximize traction when the snowmobile 10 is travelling straight, while providing suitable penetration in snow or other ground matter when cornering. Also, in this embodiment, the top surface 80 of each of the lower lateral ones of the traction projections 58 is substantially flat for at least a majority of the length Lp of that traction projection. In this example, the top surface 80 of each of the higher central ones of the traction projections 58 is substantially flat for the entirety of the length Lp of that higher central traction projection, and the top surface 80 of each of the lower lateral ones of the traction projections 58 is substantially flat for the entirety of the length Lp of that lower lateral traction projection.

In this example of implementation, each of the traction projections 58 comprises one or more propulsive protrusions 98 extending transversally to the longitudinal direction of the track 21 and occupying most of the length Lp of that traction projection and one or more reinforcing protrusions 96 larger than the propulsive protrusions 98 in the longitudinal direction of the track 21 to reinforce that traction projection for promoting traction and penetration on snow or other ground matter.

For instance, in this embodiment, each of the higher central ones of the traction projections 58 comprises its propulsive protrusions 98 that are respectively disposed between its reinforcing protrusions 96; each of the lower lateral ones of the traction projections 58 comprises its propulsive protrusion 98a that is disposed between its reinforcing protrusions 96, etc.

More particularly, in this example of implementation, the propulsive protrusions 98 of the traction projections 58 may be viewed as paddles and the reinforcing protrusions 96 of the traction projections 58 may be viewed as columns that are larger than these paddles in the longitudinal direction of the track 21 to strengthen the traction projections 58.

In this embodiment, the higher central ones of the traction projections 58 are configured to contain snow or other ground matter from the ground to enhance traction. Thus, a given one of the traction projections 58, which is denoted 58x, is a higher central traction projection 58x comprises a containment space 304 to contain an amount of snow or other ground matter when the traction projection 58x engages the ground. For instance, the containment space 304 of the higher central traction projection 58x may create a "scooping" or "cupping" action to scoop or cup the snow or other ground matter. The scooping or cupping action may further be amplified when the higher central traction projection 58x deforms as it engages the snow or other ground matter and causes the containment space 304 to expand.

In this embodiment, the containment space 304 of the higher central traction projection 58x comprises a plurality of containment voids 306 to contain respective portions of the amount of snow or other ground matter contained by the traction projection 58x. More particularly, in this embodiment, each of the containment voids 306 is implemented by a respective one of a plurality of recesses 300 defined by the propulsive protrusions 98 of the higher central traction projection 58x.

In this example, the recesses 300 implementing the containment voids 306 are distributed in a longitudinal direction of the traction projection 58x, which in this case corresponds to the widthwise direction of the track 21. This allows the traction projection 58x to contain the snow or other ground matter over a significant part of the length Lp of the traction projection 58x.

For instance, in some embodiments, the containment space 304 of the traction projection 58x may occupy at least a majority (e.g., a majority or an entirety) of the length Lp of the traction projection 58x. For example, in some embodiments, the containment space 304 of the traction projection 58x may occupy at least 60%, in some cases at least 70%, in some cases at least 80%, in some cases at least 90%, and in some cases an entirety of the length Lp of the traction projection 58x.

In this regard, in this embodiment, each of the recesses 300 of the containment space 304 of the traction projection 58x may occupy a significant part of the length Lp of the traction projection 58x. For example, in some embodiments, a recess 300a of the containment space 304 of the traction projection 58x may occupy at least 10%, in some cases at least 15%, in some cases at least 20%, in some cases at least 25%, and in some cases an even larger part of the length Lp of the traction projection 58x.

The containment space 304 of the traction projection 58x may therefore be viewed as imparting an "effective" length Lf of the traction projection 58x that exceeds the (actual) length Lp of the traction projection 58x. Basically, the traction projection 58x may be viewed as generating more traction as if it was effectively longer. The effective length Lf of the traction projection 58x can be measured by measuring a line that follows a shape of the traction projection 58x from the first longitudinal end 308 of the traction projection 58x to the second longitudinal end 308 of the traction projection 58x. Conceptually, this can be viewed as that length the traction projection 58x would have if it was straightened by straightening segments that are non-straight in the longitudinal direction of the traction projection 58x (which in this case corresponds to the widthwise direction of the track 21), i.e., the propulsive protrusions 98 defining the recesses 300 in this example, such that they are straight in the longitudinal direction of the traction projection 58x.

For instance, in some embodiments, a ratio Lf/Lp of the effective length Lf of the traction projection 58x over the length Lp of the traction projection 58x may be at least 1.1 in some cases at least 1.2, in some cases at least 1.3, in some cases at least 1.4, and in some cases even more.

Also, in this embodiment, the containment space 304 of the traction projection 58x may occupy at least a majority (e.g., a majority or an entirety) of the height H of the traction projection 58x. For example, in some embodiments, the containment space 304 of the traction projection 58x may occupy at least 60%, in some cases at least 70%, in some cases at least 80%, in some cases at least 90%, and in some cases an entirety of the height H of the traction projection 58x.

In this regard, in this embodiment, each of the recesses 300 of the containment space 304 of the traction projection 58x may occupy at least a majority of the height H of the traction projection 58x. For example, in some embodiments, a recess 300a of the containment space 304 of the traction projection 58x may occupy at least 60%, in some cases at least 70%, in some cases at least 80%, in some cases at least 90%, and in some cases an entirety of the height H of the traction projection 58x.

The amount of snow or other ground matter that can be contained in the containment space 304 of the traction projection 58x may thus be significant. This can be measured as a volume V of the containment space 304 of the traction projection 58x in which the amount of snow or other ground matter can be contained. For instance, in some embodiments, the volume V of the containment space 304 of the traction projection 58x may be at least 0.8 in$^3$, in some cases at least 1 in$^3$, in some cases at least 1.2 in$^3$, in some cases at least 1.4 in$^3$ and in some cases even more. For instance, in some cases, a ratio V/Lp of the volume V of the containment space 304 over the length Lp of the traction projection 58x may be at least 0.3 in$^3$/in, in some cases at least 0.5 in$^3$/in, in some cases at least 0.8 in$^3$/in, and in some cases even more.

In this embodiment, the volume V of the containment space 304 of the traction projection 58x corresponds to a sum of volumes Vs of the recesses 300 that can contain the snow or other ground matter. In this example, a volume Va of a recess 300a may be relatively significant. For instance, in some embodiments, the volume Va of the recess 300a may be at least at least 10%, in some cases at least 15%, in some cases at least 20%, in some cases at least 25%, and in some cases an even larger part of the volume V of the containment space 304 of the traction projection 58x.

The propulsive protrusions 98 defining the recesses 300 of the containment space 304 of the traction projection 58x may be shaped in any suitable way. In this embodiment, each one of the propulsive protrusions 98, denoted 98x is curved to define a respective one of the recesses 300, which is denoted 300a. More particularly, in this embodiment, the propulsive protrusion 98x is generally U-shaped such that its recess 300a is also U-shaped. The recess 300a is open facing the ground as the traction projection 58x approaches the ground while the track 21 moves around the track-engaging assembly 24 when the snowmobile 10 travels forward.

In this embodiment, the traction projections 58 are arranged in a pattern 63 that spans at least three of the traction rows 83 and repeats along the track 21. Also, in this embodiment, the pattern 63 of the traction projections 58 is symmetrical relative to a centerline 87 of the track 21 that is parallel to the longitudinal axis 85 of the track 21 and bisects the track 21 in its widthwise direction. The pattern 63 of the traction projections 58 may help to reduce noise generated by the track 21 in use.

More particularly, in this embodiment, the pattern 63 of the traction projections 58 is repeated at every sequence of three of the traction rows 83 along the track 21. Also, respective ones of the traction projections 58 of each traction row in the sequence of three of the traction rows 83 are configured differently (e.g., shaped differently and/or positioned differently in that traction row) than respective ones of the traction projections 58 of another traction row in the sequence of three of the traction rows 83.

In this example of implementation, the pattern 63 of the traction projections 58 is configured such that respective ones of the reinforcing protrusions 96 of the traction projections 58 converge towards the centerline 87 of the track 21. This may help for penetration on the ground. For instance, this may help to create a "planting" effect of the track 21 on the ground that may enhance handling of the snowmobile 10 at higher speeds.

More specifically, in this example of implementation, the pattern 63 of the traction projections 58 is configured such that it includes lines of reinforcement 95 that respectively pass through closest ones of the reinforcing protrusions 96 of the traction projections 58 of adjacent ones of the traction rows 83 and converge towards the centerline 87 of the track 21. For instance, in this embodiment, a given one of the lines of reinforcement 95 passes through: one of the reinforcing protrusions 96, denoted 96a, of one of the traction projections 58, denoted 58b, of a given one of the traction rows 83, denoted 83a; one of the reinforcing protrusions 96, denoted 96b, of one of the traction projections 58, denoted 58a, of another one of the traction rows 83, denoted 83c; and one of the reinforcing protrusions 96, denoted 96b, of one of the traction projections 58, denoted 58a of yet another one of the traction rows 83, denoted 83b, and converges towards the centerline 87 of the track 21 through the reinforcing protrusion 96b of the traction projection 58b of the next one of the traction rows 83. In this embodiment, another one of the lines of reinforcement 95 passes through the reinforcing protrusion 96c of the traction projection 58b of the traction row 83a, the reinforcing protrusion 96a of the traction projection 58b of the traction row 83c, and the reinforcing protrusion 96a of the traction projection 58b of the traction row 83b and converges towards the centerline 87 of the track 21 through the reinforcing protrusion 96b of the traction projection 58b of the next one of the traction rows 83; etc.

In some embodiments, the traction projections 58 may reduce power consumption to move the track 21 and/or noise generation by the track 21.

Figure 9:
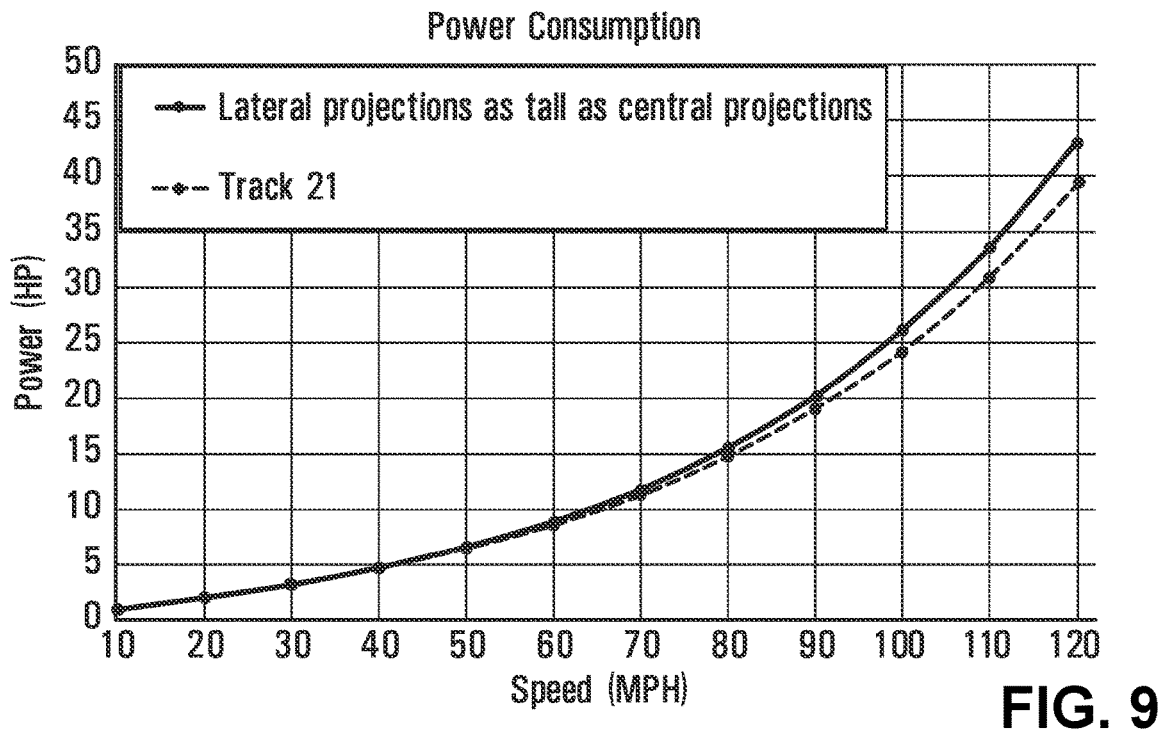
FIG. 9 shows a power consumption of the track and a power consumption of another track comprising lateral traction projections as high as central traction projections, relative to a speed of the snowmobile.

For example, in some embodiments, the track 21 may consume less power to move at a given speed than if the lower lateral ones of the tractions projections 58 were as tall as the higher central ones of the traction projections 58 but the track 21 was otherwise identical. For instance, FIG. 9 shows that, in some embodiments, the power consumption to move the track 21 a given speed, such as between 40 miles per hour (mph) and 110 mph, may be no more than 95%, in some cases no more than 90%, and in some cases no more than 85% of the power consumption to move the track 21 at the given speed than if the lower lateral ones of the tractions projections 58 were as tall as the higher central ones of the traction projections 58 but the track 21 was otherwise identical.

Figure 10:
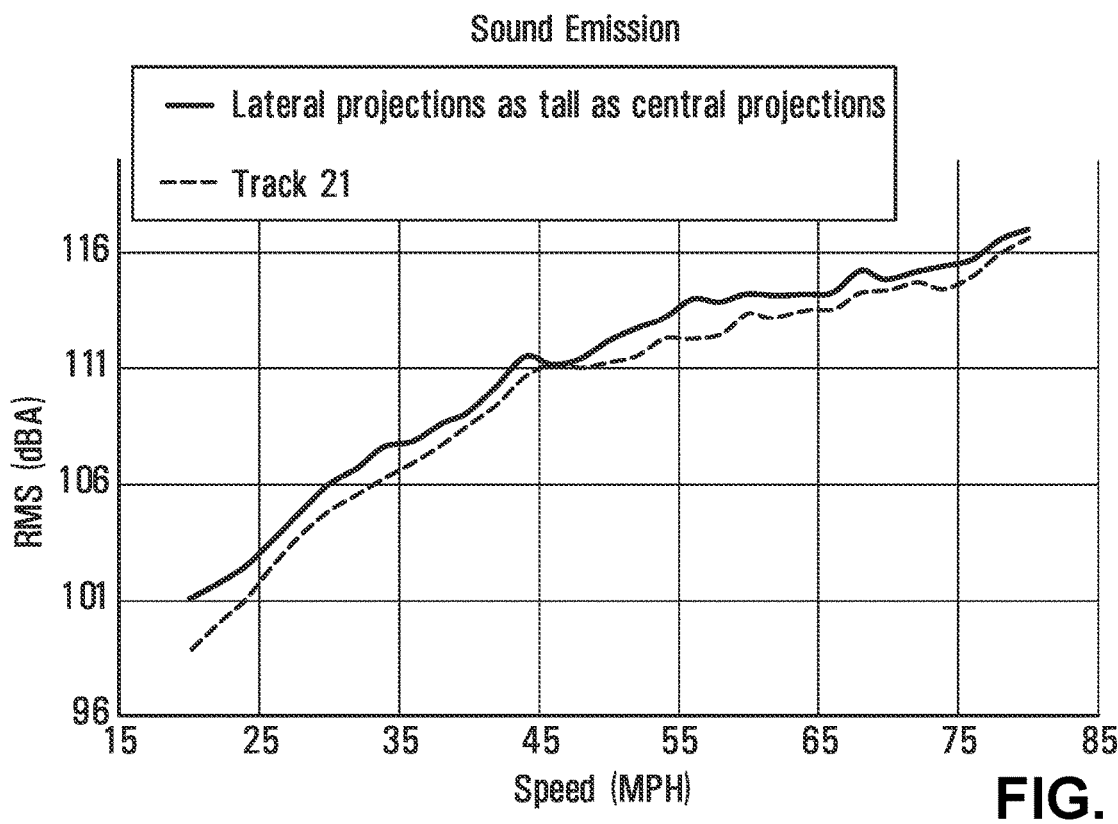
FIG. 10 shows a sound emission of the track and a sound emission the other track, relative to the speed of the snowmobile.
Figure 11:
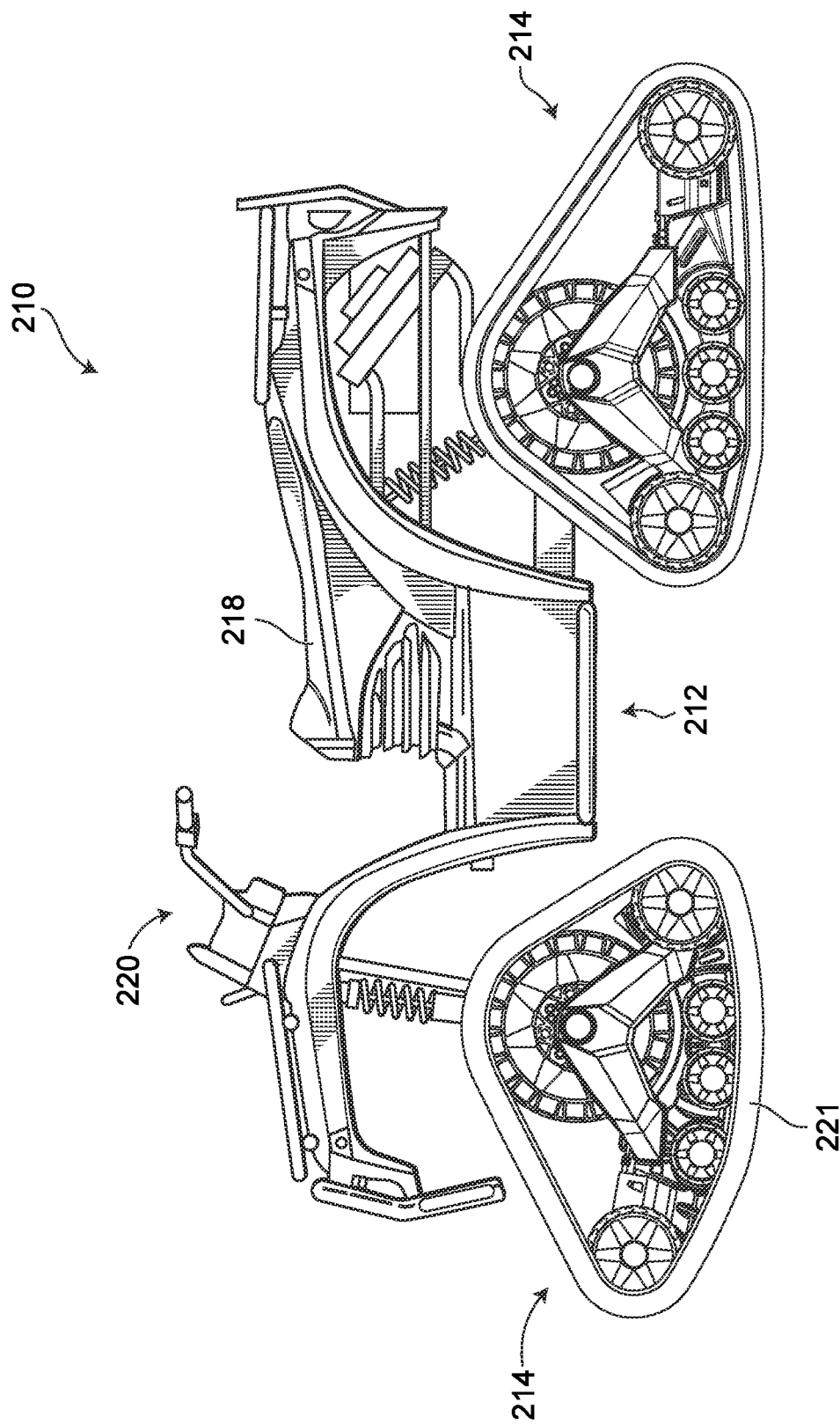
FIGS. 11 to 14 show an example of an all-terrain vehicle (ATV) comprising track systems in accordance with another embodiment of the invention, instead of being equipped with ground-engaging wheels.
Figure 12:
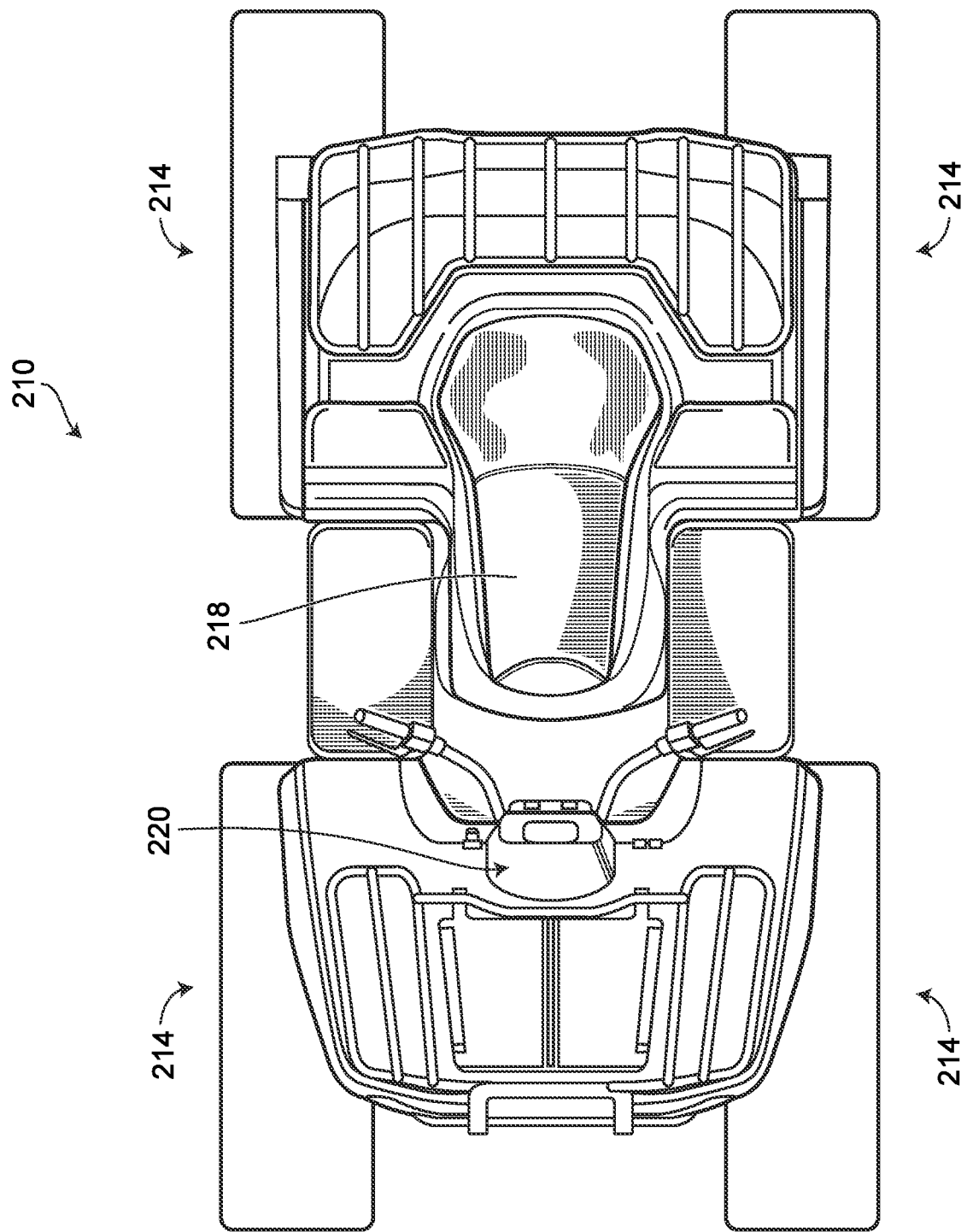
Figure 13:
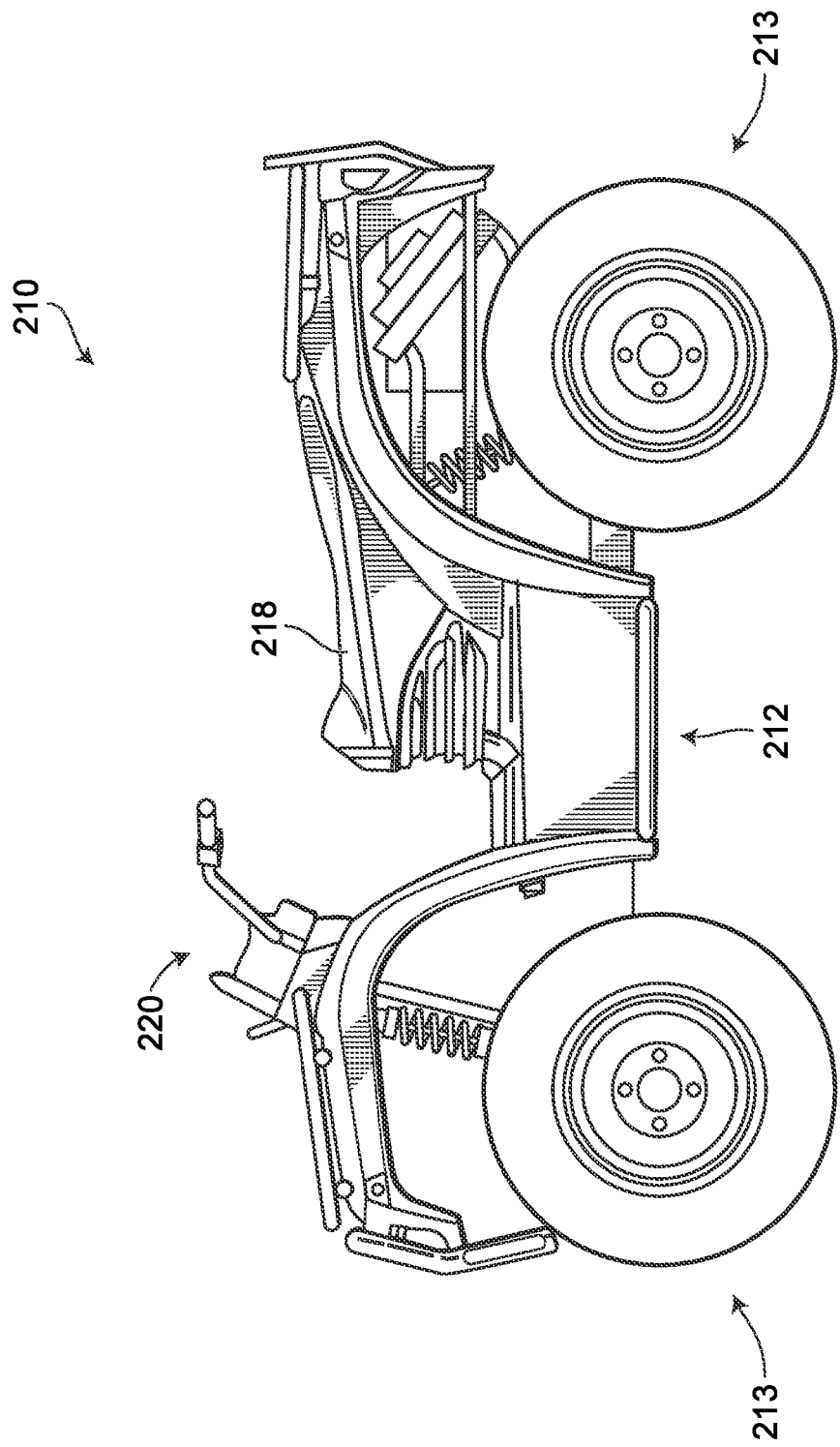
Figure 14:
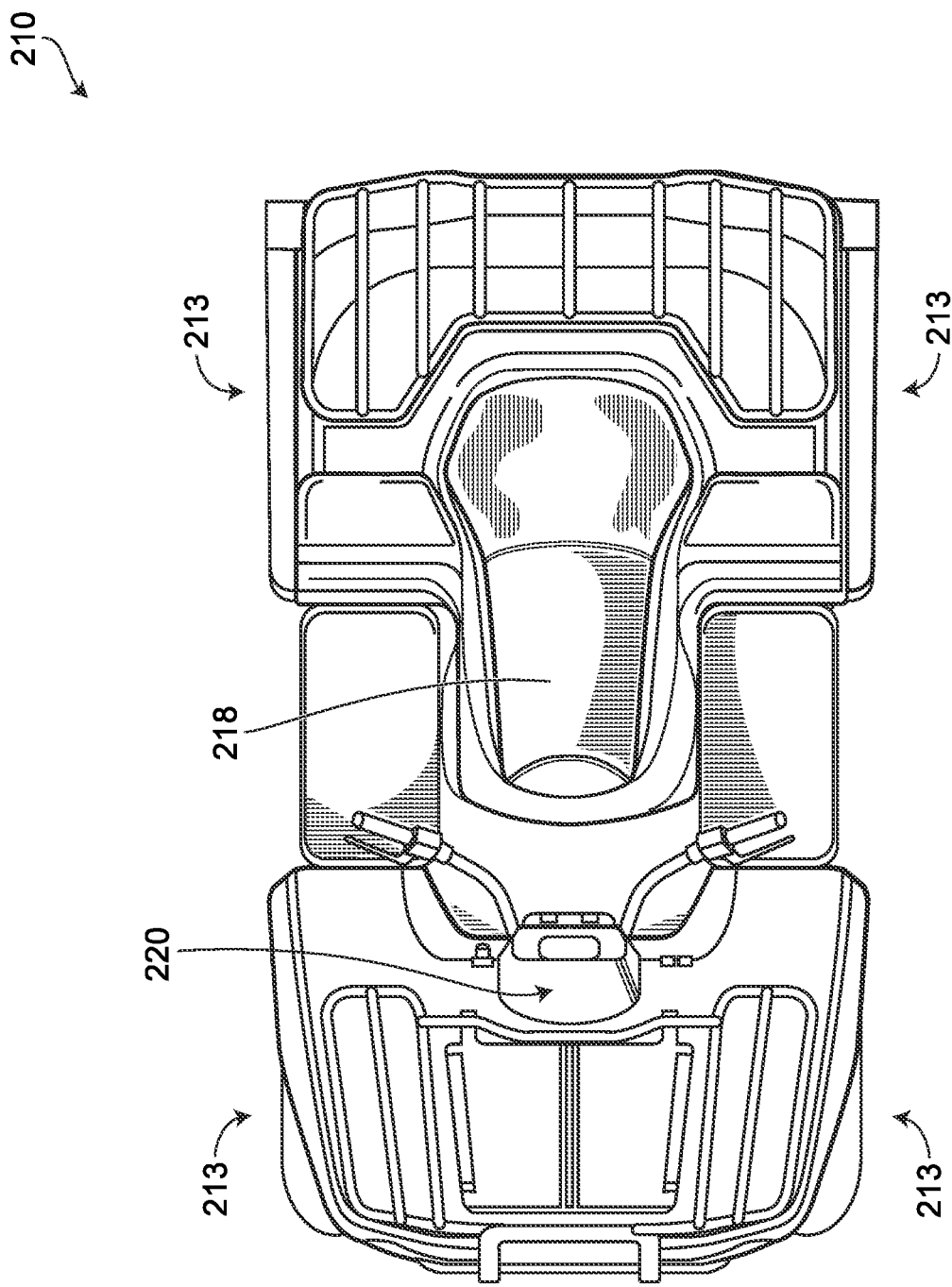

As another example, in some embodiments, the track 21 may generate less noise when moving at a given speed than if the lower lateral ones of the tractions projections 58 were as tall as the higher central ones of the traction projections 58 but the track 21 was otherwise identical. For instance, FIG. 10 shows that, in some embodiments, a sound level when the track 21 is moving at a given speed, such as between 40 miles per hour (mph) and 110 mph, may be at least 0.5 dBA (A-weighted decibels), in some cases at least 0.7 dBA, in some cases at least 0.9 dBA and in some cases even more decibels less than if the lower lateral ones of the tractions projections 58 were as tall as the higher central ones of the traction projections 58 but the track 21 was otherwise identical.

The track-engaging assembly 24 is configured to drive and guide the track 21 around the track-engaging assembly 24.

Each of the drive wheels 22 is rotatable by an axle for driving the track 21. That is, power generated by the prime mover 15 and delivered over the powertrain 12 of the snowmobile 10 rotates the axle, which rotates the drive wheels 22, which impart motion of the track 21. In this embodiment, each of the drive wheels 22, denoted 22a, comprises a drive sprocket engaging some of the drive/guide lugs 34 of the inner side 25 of the track 21 in order to drive the track 21. In other embodiments, the drive wheel 22a may be configured in various other ways. For example, in embodiments where the track 21 comprises drive holes, the drive wheel 22a may have teeth that enter these holes in order to drive the track 21. As yet another example, in some embodiments, the drive wheel 22a may frictionally engage the inner side 25 of the track 21 in order to frictionally drive the track 21. The drive wheels 22 may be arranged in other configurations and/or the track system 14 may comprise more or less drive wheels (e.g., a single drive wheel, more than two drive wheels, etc.) in other embodiments.

The idler wheels 26, 28, 30 are not driven by power supplied by the prime mover 15, but are rather used to do at least one of guiding the track 21 as it is driven by the drive wheels 22, tensioning the track 21, and supporting part of the weight of the snowmobile 10 on the ground via the track 21. More particularly, in this embodiment, the rear idler wheels 26 are trailing idler wheels that maintain the track 21 in tension, guide the track 21 as it wraps around them, and can help to support part of the weight of the snowmobile 10 on the ground via the track 21. The lower roller wheels 28 roll on the inner side 25 of the track 21 along the bottom run 66 of the track 21 to apply the bottom run 66 on the ground. The upper roller wheels 30 roll on the inner side 25 of the track 21 along the top run 65 of the track 21 to support and guide the top run 65 as the track 21 moves. The idler wheels 26, 28, 30 may be arranged in other configurations and/or the track assembly 14 may comprise more or less idler wheels in other embodiments.

The frame 23 of the track system 14 supports various components of the track-engaging assembly 24, including, in this embodiment, the idler wheels 26, 28, 30. More particularly, in this embodiment, the frame 23 comprises an elongate support 62 extending in the longitudinal direction of the track system 14 along the bottom run 66 of the track 21 and frame members 49 extending upwardly from the elongate support 62.

The elongate support 62 comprises rails 44 extending in the longitudinal direction of the track system 14 along the bottom run 66 of the track 21. In this example, the idler wheels 26, 28 are mounted to the rails 44. In this embodiment, the elongate support 62 comprises the sliding surfaces 77 for sliding on the inner side 25 of the track 21 along the bottom run 66 of the track 21. Thus, in this embodiment, the idler wheels 26, 28 and the sliding surfaces 77 of the elongate support 62 can contact the bottom run 66 of the track 21 to guide the track 21 and apply it onto the ground for traction. In this example, the sliding surfaces 77 can slide against the inner surface 32 of the carcass 35 and can contact respective ones of the drive/guide lugs 34 to guide the track 21 in motion. Also, in this example, the sliding surfaces 77 are curved upwardly in a front region of the track system 14 to guide the track 21 towards the drive wheels 22.

In this embodiment, the elongate support 62 comprises sliders 33 mounted to respective ones of the rails 44 and comprising respective ones of the sliding surfaces 77. In this embodiment, the sliders 33 are mechanically interlocked with the rails 44. In other embodiments, instead of or in addition to being mechanically interlocked with the rails 44, the sliders 33 may be fastened to the rails 44. For example, in some embodiments, the sliders 33 may be fastened to the rails 44 by one or more mechanical fasteners (e.g., bolts, screws, etc.), by an adhesive, and/or by any other suitable fastener.

In some examples, each one of the sliders 33, denoted 33a, may comprise a low-friction material which may reduce friction between its respective one of the sliding surfaces 77, denoted 77a, and the inner side 25 of the track 21. For instance, the slider 33a may comprise a polymeric material having a low coefficient of friction with the rubber of the track 21. For example, in some embodiments, the slider 33a may comprise a thermoplastic material (e.g., a Hifax® polypropylene). The slider 33a may comprise any other suitable material in other embodiments. For instance, in some embodiments, the sliding surface 77a of the slider 33a may comprise a coating (e.g., a polytetrafluoroethylene (PTFE) coating) that reduces friction between it and the inner side 25 of the track 21, while a remainder of the slider 33a may comprise any suitable material (e.g., a metallic material, another polymeric material, etc.).

While in embodiments considered above the sliding surface 77a is part of the slider 33a which is separate from and mounted to each one of the rails 44, denoted 44a, in other embodiments, the sliding surface 77a may be part of the rail 44a. That is, the sliding surface 77a may be integrally formed (e.g., molded, cast, or machined) as part of the rail 44a.

The frame members 49 extend upwardly from the elongate support 62 to hold the upper roller wheels 30 such that the upper roller wheels 30 roll on the inner side 25 of the track 21 along the top run 65 of the track 21.

The track-engaging assembly 24 may be implemented in any other suitable way in other embodiments.

While in embodiments considered above the track system 14 is part of the snowmobile 10, a track system including a track constructed according to principles discussed herein may be used as part of other off-road vehicles in other embodiments.

Figure 15:
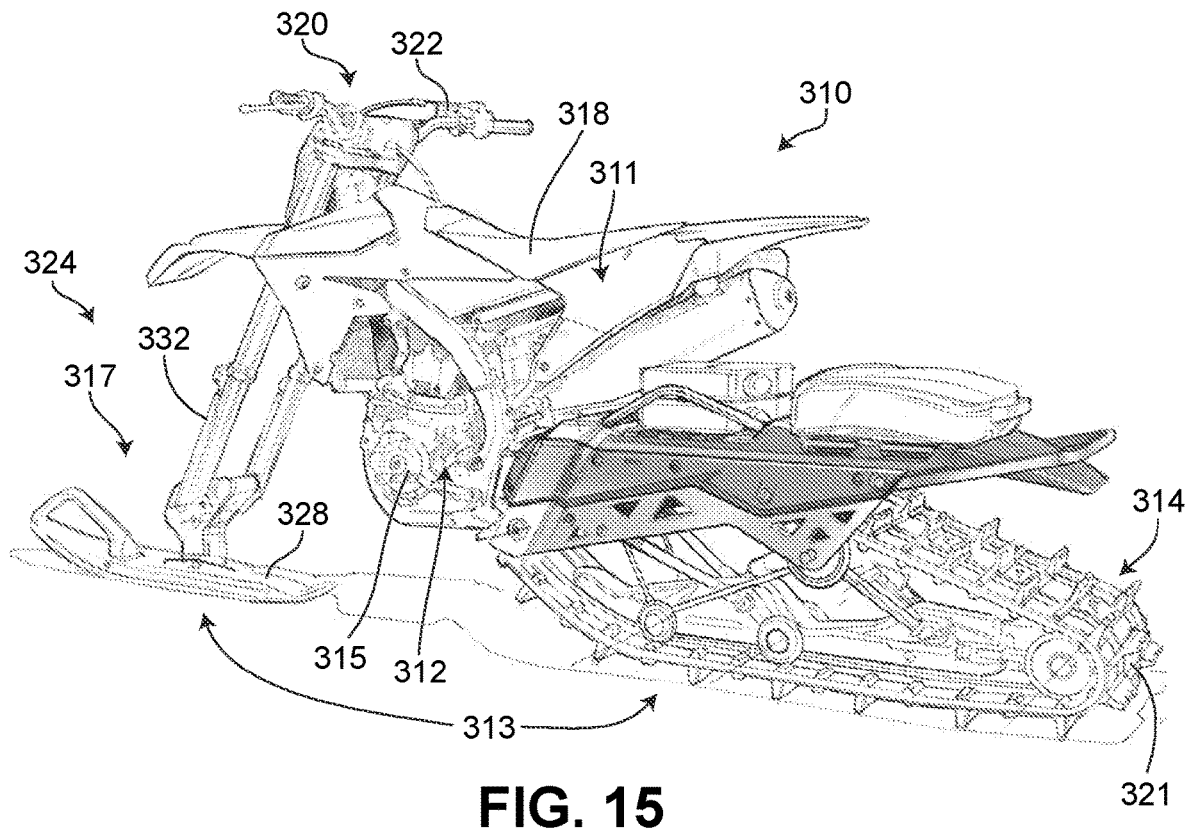
FIGS. 15 and 16 show an example of a snow bike comprising a track system in accordance with another embodiment of the invention, instead of being equipped with a rear wheel.

For example, in some embodiments, as shown in FIG. 15, a snow bike 310 comprises a frame 311, a powertrain 312, a ski system 317, a track system 314 including a track 321, a seat 318, and a user interface 320 which enables a user to ride, steer and otherwise control the snow bike 310, and the track 321 may be constructed according to principle discussed herein in respect of the track 21.

Figure 16:
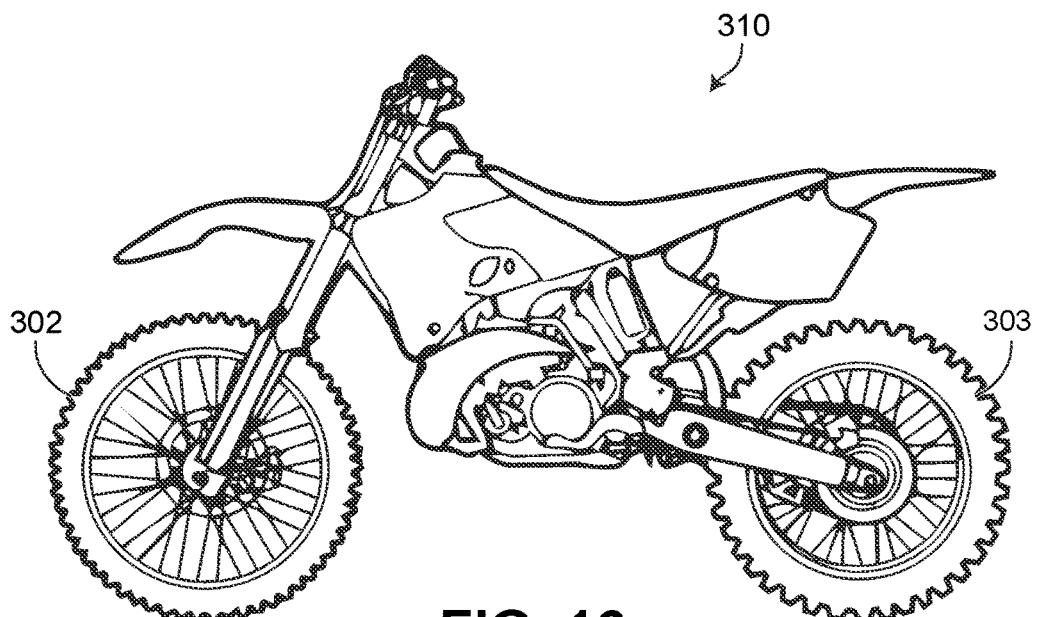

In this embodiment, as shown in FIG. 16, the snow bike 310 is a motorcycle equipped with the ski system 317 mounted in place of a front wheel 302 of the motorcycle 310 and the track system 314 mounted in place of a rear wheel 303 of the motorcycle 310. In this example, the track system 314 also replaces a rear suspension unit (e.g., a shock absorber and a swing arm) of the motorcycle. Basically, in this embodiment, the ski system 317 and the track system 314 are part of a conversion system 313 that converts the motorcycle into a skied and tracked vehicle for travelling on snow.

The powertrain 312 is configured for generating motive power and transmitting motive power to the track system 314 to propel the snow bike 310 on the ground. To that end, the powertrain 312 comprises a prime mover 315, which is a source of motive power that comprises one or more motors (e.g., an internal combustion engine, an electric motor, etc.). For example, in this embodiment, the prime mover 315 comprises an internal combustion engine. In other embodiments, the prime mover 315 may comprise another type of motor (e.g., an electric motor) or a combination of different types of motor (e.g., an internal combustion engine and an electric motor). The prime mover 315 is in a driving relationship with the track system 314. That is, the powertrain 312 transmits motive power from the prime mover 315 to the track system 314 in order to drive (i.e., impart motion to) the track system 314.

The seat 318 accommodates the user of the snow bike 310. In this case, the seat 318 is a straddle seat and the snow bike 310 is usable by a single person such that the seat 318 accommodates only that person driving the snow bike 310. In other cases, the seat 318 may be another type of seat, and/or the snow bike 310 may be usable by two individuals, namely one person driving the snow bike 310 and a passenger, such that the seat 318 may accommodate both of these individuals (e.g., behind one another).

The user interface 320 allows the user to interact with the snow bike 310 to control the snow bike 310. More particularly, in this embodiment, the user interface 320 comprises an accelerator, a brake control, and a steering device comprising handlebars 322 that are operated by the user to control motion of the snow bike 510 on the ground. The user interface 320 also comprises an instrument panel (e.g., a dashboard) which provides indicators (e.g., a speedometer indicator, a tachometer indicator, etc.) to convey information to the user.

The ski system 317 is disposed in a front 324 of the snow bike 310 to engage the ground and is turnable to steer the snow bike 310. To that end, the ski system 14 is turnable about a steering axis of the snow bike 310. The ski system 317 comprises a ski 328 to slide on the snow and a ski mount 330 that connects the ski 328 to a front steerable member 332 of the snow bike 310. In this embodiment where the snow bike 310 is a motorcycle and the ski system 317 replaces the front wheel 302 of the motorcycle, the front steerable member 332 comprises a front fork 334 of the snow bike 310 that would otherwise carry the front wheel 302.

The ski 328 is a sole ski of the snow bike 310. That is, the snow bike 310 has no other ski. Notably, the ski 328 is disposed in a center of the snow bike 310 in a widthwise direction of the snow bike 310. In this embodiment in which the snow bike 310 is a motorcycle and the ski system 317 replaces the front wheel 302 of the motorcycle, the ski 328 contacts the ground where the front wheel 302 would contact the ground.

Any feature described herein with respect to the track system 14 of the snowmobile 10, including its track 21, may be applied to the track system 314 of the snow bike 310, including its track 321.

As another example, in some embodiments, as shown in FIGS. 11-14, an ATV 210 comprises a set of track systems 214 providing traction to the ATV on the ground, where each of the track systems 214 comprises a track 221 that may be constructed according to principle discussed herein in respect of the track 21.

The ATV 210 comprises a prime mover 212 in a driving relationship with the track systems 214 via the ATV's powertrain, a seat 218, and a user interface 220, which enable a user of the ATV 210 to ride the ATV 210 on the ground. In this case, the seat 218 is a straddle seat and the ATV 210 is usable by a single person such that the seat 218 accommodates only that person driving the ATV 210. In other cases, the seat 218 may be another type of seat, and/or the ATV 210 may be usable by two individuals, namely one person driving the ATV 210 and a passenger, such that the seat 218 may accommodate both of these individuals (e.g., behind one another or side-by-side) or the ATV 210 may comprise an additional seat for the passenger. For example, in other embodiments, the ATV 210 may be a side-by-side ATV, sometimes referred to as a "utility terrain vehicle" or "UTV". The user interface 220 comprises a steering device operated by the user to control motion of the ATV 210 on the ground. In this case, the steering device comprises handlebars. In other cases, the steering device may comprise a steering wheel or other type of steering element. Each of the front track systems 214 is pivotable about a steering axis of the ATV 210 in response to input of the user at the handlebars in order to steer the ATV 210 on the ground.

In this embodiment, each one the track systems 214, is mounted in place of a respective one of the ground-engaging wheels 213 that may otherwise be mounted to the ATV 210 to propel the ATV 210 on the ground. That is, the ATV 210 may be propelled on the ground by four ground-engaging wheels 213 with tires instead of the track systems 214. Basically, in this embodiment, the track systems 214 may be used to convert the ATV 210 from a wheeled vehicle into a tracked vehicle, thereby enhancing its traction and floatation on the ground.

Any feature described herein with respect to the track system 14 of the snowmobile 10, including its track 21, may be applied to a given one of the track systems 214 of the ATV 210, including its track 221.

The snowmobile 10, the snow bike 310 and the ATV 210 considered above are examples of tracked recreational vehicles. While they can be used for recreational purposes, such tracked recreational vehicles may also be used for utility purposes in some cases.

In other embodiments, a track system constructed according to principles discussed herein may be used as part of an agricultural vehicle (e.g., a tractor, a harvester, etc.), as part of a construction vehicle, forestry vehicle or other industrial vehicle, or as part of a military vehicle.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track for traction of a vehicle, the track being movable around a track-engaging assembly comprising a plurality of track-contacting wheels, the track comprising:
a ground-engaging outer surface for engaging the ground;
an inner surface opposite to the ground-engaging outer surface; and
a plurality of traction projections projecting from the ground-engaging outer surface; wherein: a central one of the traction projections is located between lateral ones of the traction projections in a widthwise direction of the track and is taller than the lateral ones of the traction projections; the central one of the traction projections comprises a containment space to contain an amount of ground matter when the central one of the traction projections engages the ground; and at least part of the central one of the traction projections is curved in the widthwise direction of the track to define the containment space; and
wherein the containment space of the central one of the traction projections is larger in the widthwise direction of the track than each of the lateral ones of the traction projections.

2. The track of claim 1, wherein a top surface of the central one of the traction projections is substantially flat for at least a majority of a length of the central one of the traction projections.

3. The track of claim 2, wherein a top surface of each lateral one of the traction projections is substantially flat for at least a majority of a length of the lateral one of the traction projections.

4. The track of claim 2, wherein: the top surface of the central one of the traction projections is substantially flat for an entirety of the length of the central one of the traction projections; and the top surface of the lateral one of the traction projections is substantially flat for an entirety of the length of the lateral one of the traction projections.

5. The track of claim 1, wherein the central one of the traction projections occupies more than one-third of a width of the track.

6. The track of claim 5, wherein the central one of the traction projections occupies at least 40% of the width of the track.

7. The track of claim 1, comprising a plurality of windows extending from the ground-engaging outer surface to the inner surface, wherein the central one of the traction projections occupies at least 80% of a distance between a first one of the windows and a second one of the windows in the widthwise direction of the track.

8. The track of claim 7, wherein the central one of the traction projections occupies at least 90% of the distance between the first one of the windows and the second one of the windows in the widthwise direction of the track.

9. The track of claim 1, wherein a ratio of a height of each lateral one of the traction projections over a height of the central one of the traction projections is no more than 95%.

10. The track of claim 9, wherein the ratio of the height of the lateral one of the traction projections over the height of the central one of the traction projections is no more than 90%.

11. The track of claim 10, wherein the ratio of the height of the lateral one of the traction projections over the height of the central one of the traction projections is no more than 85%.

12. The track of claim 1, wherein the central one of the traction projections comprises a propulsive protrusion extending transversally to a longitudinal direction of the track and a reinforcing protrusion larger than the propulsive protrusion of the central one of the traction projections in the longitudinal direction of the track.

13. The track of claim 12, wherein: the reinforcing protrusion of the central one of the traction projections is a first reinforcing protrusion of the central one of the traction projections; the central one of the traction projections comprises a second reinforcing protrusion larger than the propulsive protrusion of the central one of the traction projections in the longitudinal direction of the track; and the propulsive protrusion of the central one of the traction projections is located between the first reinforcing protrusion of the central one of the traction projections and the second reinforcing protrusion of the central one of the traction projections in the widthwise direction of the track.

14. The track of claim 13, wherein: the central one of the traction projections comprises a third reinforcing protrusion larger than each of the first propulsive protrusion and the second propulsive protrusion of the central one of the traction projections in the longitudinal direction of the track; and the second propulsive protrusion of the central one of the traction projections is located between the second reinforcing protrusion of the central one of the traction projections and the third reinforcing protrusion of the central one of the traction projections in the widthwise direction of the track.

15. The track of claim 1, wherein the containment space of the central one of the traction projections comprises a plurality of containment voids to contain respective portions of the amount of ground matter.

16. The track of claim 1, wherein the containment space of the central one of the traction projections occupies at least a majority of a length of the central one of the traction projections.

17. The track of claim 16, wherein the containment space of the central one of the traction projections occupies at least 70% of the length of the central one of the traction projections.

18. The track of claim 1, wherein: the traction projections are disposed in a plurality of traction rows that include respective ones of the traction projections and that are spaced from one another in a longitudinal direction of the track; and the traction projections are arranged in a pattern that spans at least three of the traction rows and repeats along the track.

19. The track of claim 18, wherein the pattern of the traction projections is symmetrical relative to a centerline of the track that bisects the track in the widthwise direction of the track.

20. The track of claim 18, wherein the pattern of the traction projections is repeated at every sequence of three of the traction rows along the track.

21. The track of claim 20, wherein the traction projections of each of the traction rows in the pattern of the traction projections are configured differently than the traction projections of another of the traction rows in in the pattern of the traction projections.

22. The track of claim 1, wherein: each of the traction projections comprises a propulsive protrusion extending transversally to a longitudinal direction of the track and a reinforcing protrusion larger than the propulsive protrusion in the longitudinal direction of the track; the traction projections are disposed in a plurality of traction rows that include respective ones of the traction projections and that are spaced from one another in a longitudinal direction of the track; the traction projections are arranged in a pattern that spans at least three of the traction rows and repeats along the track; and the pattern of the traction projections is configured such that the reinforcing protrusions of respective ones of the traction projections converge towards a centerline of the track that bisects the track in the widthwise direction of the track.

23. The track of claim 1, wherein the track consumes less power to move at a given speed than if the lateral ones of the traction projections were as tall as the central one of the traction projections but the track was otherwise identical.

24. The track of claim 1, wherein the track generates less noise when moving at a given speed than if the lateral ones of the traction projections were as tall as the central one of the traction projections but the track was otherwise identical.

25. The track of claim 1, comprising a plurality of wheel-contacting projections projecting from the inner surface for contacting at least one of the wheels.

26. The track of claim 25, wherein the wheels include a drive wheel for driving the track and the wheel-contacting projections are drive projections to engage the drive wheel.

27. The track of claim 12, wherein at least part of the propulsive protrusion is curved in the widthwise direction of the track to define the containment space.

28. A track for traction of a vehicle, the track being movable around a track-engaging assembly comprising a plurality of track-contacting wheels, the track comprising:
a ground-engaging outer surface for engaging the ground;
an inner surface opposite to the ground-engaging outer surface; and
a plurality of traction projections projecting from the ground-engaging outer surface; wherein: a central one of the traction projections is located between lateral ones of the traction projections in a widthwise direction of the track and is taller than the lateral ones of the traction projections; the central one of the traction projections occupies more than one-third of a width of the track; the central one of the traction projections comprises a containment space to contain an amount of ground matter when the central one of the traction projections engages the ground; and at least part of the central one of the traction projections is curved in the widthwise direction of the track to define the containment space; and
wherein the containment space of the central one of the traction projections is larger in the widthwise direction of the track than each of the lateral ones of the traction projections.

29. The track of claim 1, wherein the top surface of the central one of the traction projections is parallel to the ground-engaging outer surface for at least the majority of the length of the central one of the traction projections.

30. A track for traction of a vehicle, the track being movable around a track-engaging assembly comprising a plurality of track-contacting wheels, the track comprising:
a ground-engaging outer surface for engaging the ground;
an inner surface opposite to the ground-engaging outer surface; and
a plurality of traction projections projecting from the ground-engaging outer surface; wherein: a central one of the traction projections is located between lateral ones of the traction projections in a widthwise direction of the track and is taller than the lateral ones of the traction projections; each of the central one of the traction projections and the lateral ones of the traction projections comprises a containment space to contain an amount of ground matter when the traction projection engages the ground; and a volume of the containment space of the central one of the traction projections is greater than a volume of the containment space of a given one of the lateral ones of the traction projections; and
wherein the containment space of the central one of the traction projections is larger in the widthwise direction of the track than each of the lateral ones of the traction projections.

31. The track of claim 13, wherein the first reinforcing protrusion is aligned with the second reinforcing protrusion in the longitudinal direction of the track.

32. The track of claim 13, wherein the propulsive protrusion of the central one of the traction projections connects the first reinforcing protrusion to the second reinforcing protrusion.

33. The track of claim 1, wherein at least a majority of the central one of the traction projections is curved in the widthwise direction of the track to define the containment space.

34. The track of claim 28, wherein at least a majority of the central one of the traction projections is curved in the widthwise direction of the track to define the containment space.

35. The track of claim 30, wherein at least a majority of the central one of the traction projections is curved in the widthwise direction of the track to define the containment space.

* * * * *

UNITED STATES PATENT AND TRADEMARK OFFICE
CERTIFICATE OF CORRECTION

PATENT NO. : 11,639,209 B2
APPLICATION NO. : 15/712818
DATED : May 2, 2023
INVENTOR(S) : Jules Dandurand It is certified that error appears in the above-identified patent and that said Letters Patent is hereby corrected as shown below:

In the Specification

Column 6, Lines 38 through 51, should be deleted.

Signed and Sealed this
Twentieth Day of June, 2023

Katherine Kelly Vidal
*Director of the United States Patent and Trademark Office*